United States Patent [19]

Rokugo

[11] 4,397,017
[45] Aug. 2, 1983

[54] STUFF SYNCHRONIZATION DEVICE WITH REDUCED SAMPLING JITTER

[75] Inventor: Yoshinori Rokugo, Tokyo, Japan

[73] Assignee: Nippon Electric Co., Ltd., Tokyo, Japan

[21] Appl. No.: 239,865

[22] Filed: Mar. 2, 1981

[51] Int. Cl.³ .............................................. H04J 3/07
[52] U.S. Cl. .............................. 370/102; 340/347 DD
[58] Field of Search ................................ 370/102, 84; 340/347 DD; 375/106

[56] References Cited

U.S. PATENT DOCUMENTS

| | | | |
|---|---|---|---|
| 3,985,963 | 10/1976 | Boutmy et al. | 370/102 |
| 3,987,248 | 10/1976 | Platet et al. | 370/102 |
| 4,079,371 | 3/1978 | Shimamura | 370/102 |
| 4,132,862 | 1/1979 | Ferret et al. | 370/102 |
| 4,196,315 | 4/1980 | Boutmy et al. | 370/102 |

*Primary Examiner*—Douglas W. Olms
*Attorney, Agent, or Firm*—Sughrue, Mion, Zinn, Macpeak & Seas

[57] ABSTRACT

It has now been confirmed as regards a stuff (justification) synchronization device for each of plesiochronous input pulse sequence to be time division multiplexed that a low frequency jitter component appears in a synchronous output pulse sequence from the effect of sampling phase lags of read pulse sequences for reading the output pulse sequence for stuffing from an elastic memory (36) of the device relative to write pulse sequences for storing the input pulse sequence in the memory at a sampling interval equal to the memory capacity. The jitter is reduced (1) by selecting a prime number, preferably thirteen and more preferably seventeen or nineteen, as the memory capacity, (2) by cyclically using selected write and read pulse sequences for phase lag monitoring, or (3) by rendering the sampling interval either random or equivalently random.

8 Claims, 22 Drawing Figures

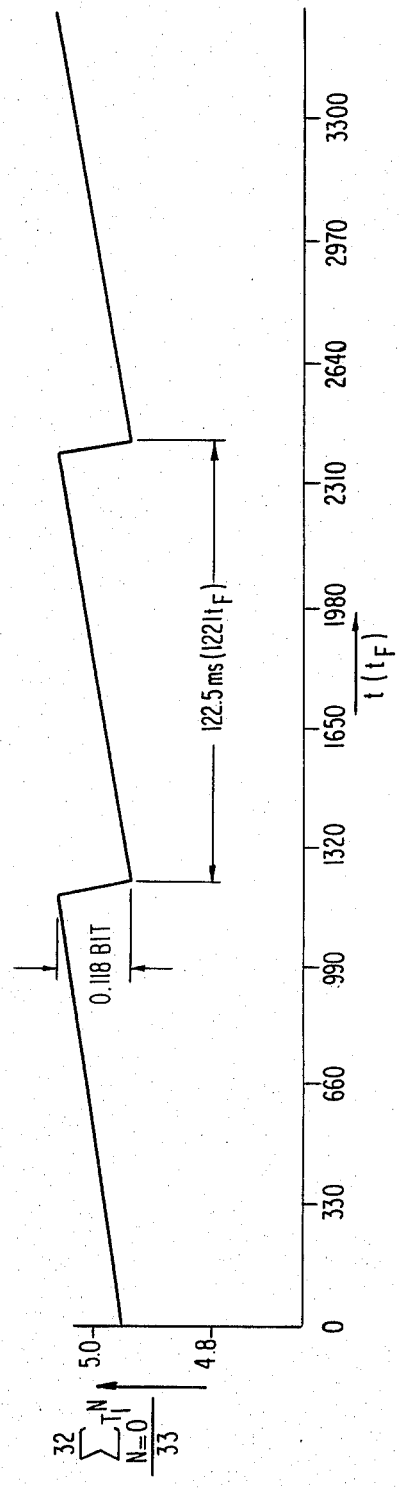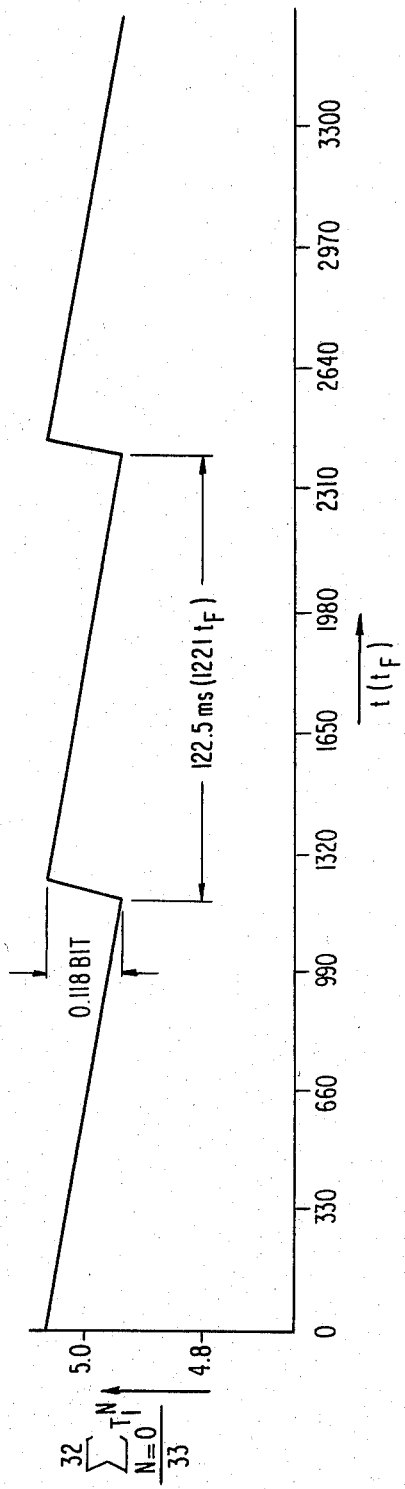

STUFF SYNCHRONIZATION DEVICE WITH REDUCED SAMPLING JITTER

BACKGROUND OF THE INVENTION

This invention relates to a device responsive to an input pulse sequence comprising input information bits or pulses for producing an output pulse sequence in synchronism with a sequence of reference clock pulses with stuff or justification bits or pulses interspersed in the output pulse sequence among output information bits or pulses derived from the respective input information pulses. Such a pulse stuff synchronization device is useful in a multiplexer used at a transmitting end of a time division multiplexed digital communication network because the device raises the network flexibility and facilitates the network design.

As described in an article contributed by E. R. Brigham et al. to "The Post Office Electrical Engineers' Journal," Vol. 69 (1976), No. 2, pages 93–102, under the title of "Multiplexing for a Digital Main Network," predetermined number, such as four of plesiochronous lower order pulse sequences are supplied to a multiplexer through input tributaries at a transmitting end of a time division multiplexed digital communication network. Each lower order pulse sequence comprises lower order bits or pulses at a lower bit rate. The multiplexer multiplexes the lower order pulse sequences into a higher order pulse sequence of a higher bit rate. Another multiplexer at the transmitting end may use such higher order pulse sequences as lower order synchronous or plesiochronous pulse sequences therefor in producing another higher order pulse sequence. The multiplexing may be carried out at another transmitting end of the network. The process may be repeated to provide a very high order pulse sequence. At a receiving end of the network, a demultiplexer demultiplexes a higher order pulse sequence supplied thereto into reproductions of the lower order pulse sequences which are multiplexed at a transmitting end into the supplied higher order pulse sequence. The multiplication may be carried out either with information pulses of the respective lower order pulse sequences interleaved in the higher order pulse sequence or with groups of such information pulses interleaved. It will be assumed in the following that bit interleaving is resorted to.

In a multiplexer, a pulse stuff synchronization device is usually used to convert each of the lower order pulse sequences supplied thereto as an input pulse sequence into an output pulse sequence of the type described. The output pulse sequence has consecutive output bit positions specified by the respective reference clock pulses and having a common duration or width called an output bit period. The output bit positions will herein be referred to simply as the time or pulse slots. Such output pulse sequences are multiplexed into the higher order pulse sequence. The reference clock pulse sequence defines an output bit rate of the output pulse sequence. The output bit rate is equal to the higher bit rate divided by the predetermined number. Pulse slots of the respective output pulse sequences, one from each output pulse sequence, are arranged in succession at a plurality of higher order bit positions, respectively.

The higher order pulse sequence is divisible into a succession of frames, each consisting of a prescribed number of higher order bit positions. Each frame thus has a prescribed frame length or period. The demultiplexer must be capable of determining which higher order bit positions are assigned in the respective frames to which lower order pulse sequence. Each frame therefore includes several frame synchronizing or alignment bits or pulses at predetermined ones of the higher order bit positions, respectively.

Each pulse stuff synchronization device comprises an elastic memory having several one-bit memory cells for storing consecutive input information pulses, equal in number to the memory cells at a time. The input information pulses stored in the elastic memory in a cyclic manner from time to time are read out as the respective output information pulses.

The output pulse sequence is also divisible into a succession of frames, each having the prescribed frame period. Each frame thus has a preselected number of pulse slots in succession. The preselected number is equal to the prescribed number divided by the predetermined number. According to a numerical example, the preselected number is two hundred and twelve. In this event, the pulse slots are serially numbered in each frame from No. 1 to No. 212. It is possible to identify the pulses in the respective pulse slots by the use of the serial numbers for the pulse slots. Three pulse slots at the beginning or leading end portion of each frame, namely, the No. 1 through No. 3 pulse slots, are usually used for no output information pulses. This is because the frame alignment pulses and similar service bits or pulses are later placed in these three pulse slots on multiplexing. A predetermined pulse slot in each frae, such as the No. 161 pulse slot, is used as a stuffable or justifiable slot in which either an output information pulse or a stuff pulse is placed. In this sense, the stuffable slot is called a variable slot. Either the output information pulse or the stuff pulse located in the variable slot may be named a variable pulse. At least one predetermined pulse slot in each frame is used as a stuff orjustification control slot. Preferably, three predetermined pulse slots, such as the No. 54, No. 107, and No. 160 pulse slots, are used as first through third stuff control slots for stuff or justification control bits or pulses which are indicative, according to the majority decision, of presence of the output information pulse and of the stuff pulse in the variable slot next following the stuff control slots in question. Other pulse slots are exclusively for the output information pulses. The pulse slots in which the respective output information pulses can be placed, including the variable slot, will herein be called information slots. The pulse slots other than the information slots will herein be named service slots, excluding the variable slots even if a stuff pulse, rather than an output information pulse, is situated therein. According to the numerical example, each frame has two hundred and six information slots.

The input pulse sequence has a succession of input bit positions having a common input bit period and defined by an input clock pulse sequence of the lower bit rate, which may now be called an input bit rate. The input bit positions may include service bit positions similar to the service slots. Other input bit positions are information bit positions for the respective input information pulses. Merely for simplicity of description, it will be presumed in the following that all input bit positions are the information bit positions unless otherwise specified.

The input information pulses are stored in the elastic memory by the use of a plurality of write pulse sequences, equal in number to the memory cells, into which the input clock pulse sequence is distributed. The stored pulses are read out by a plurality of read pulse sequences, again equal in number to the memory cells, into which the reference clock pulse sequence is distributed. It is to be noted here that the stored pulses should not be read out at the service slots. The reference clock pulse sequence should therefore be gapped, prior to distribution, at the reference clock pulses indicative of the service slots. Such a gapped reference clock pulse sequence will, however, be referred to merely as a reference clock pulse sequence in the following because the instant invention has no concern with presence of the service slots in the output pulse sequence.

As described, at least the service pulses are inserted in the output pulse sequence in practice. The output bit rate must therefore be a little higher than the input bit rate. The write pulse sequences should nevertheless have a first phase that always leads a second phase had by the read pulse sequences. In other words, the second phase should always have a phase lag relative to the first phase. This is mandatory for correct read out of the output information pulses. According to the numerical example, the phase lag should correspond to a few input bit periods or output bit periods when an input information pulse is read out of the elastic memory as an output information pulse for the first time in each frame, namely, as the No. 4 output information pulse.

The pulse stuff synchronization device further comprises a phase lag monitor for use in monitoring the phase lag. When the phase lag decreases below a predetermined threshold in a certain frame at an instant herein called a monitor slot of the frame, the phase lag monitor produces a stuff demand pulse for retarding the second phase and for thereby keeping the second phase always behind the first phase. Inasmuch as the phase lag generally decreases in each frae, the monitor slot usually falls in the trailing end portion of each frame, such as from the No. 212 pulse slot back to, for example, the No. 199 pulse slot. The monitor slot is one of the information slots and will later be discussed in detail.

Responsive to the stuff demand pulse, a stuff pulse is subsequently produced. Before production of the stuff pulse, the stuff control pulses in the stuff control slots next following the monitor slot under consideration, namely, in the next succeeding frame, are made to indicate appearance of a stuff pulse in the variable slot that is next subsequent to the stuff control slots in question. If the phase lag is greater than the threshold at the monitor slot, no stuff demand pulse is produced. The stuff control pulses are made to indicate appearance of an output information pulse in the next following variable slot. In order to insert the stuff pulse, the reference clock pulse sequence has to be gapped as will become clear later.

It is known that jitter occurs in the output pulse sequence and consequently in a reproduction of the original input pulse sequence. The jitter adversely affects the quality of the reproduced pulse sequence if not properly suppressed. The jitter includes a waiting time jitter component that results from a waiting time from an instant at which the phase lag actually decreases below the threshold until insertion of a stuff pulse in the next succeeding variable slot. This component may have a low frequency and has been believed to be most detrimental to the quality of the reproduced pulse sequence. It is possible to considerably suppress the waiting time jitter component by a phase lock loop used in the demultiplexer. Furthermore, this component is discussed in various references, the Brigham et al article inclusive.

We have found that another low frequency jitter component remains after suppression of the waiting time jitter component. It is very difficult to suppress the remaining low frequency jitter component by the phase lock loop. As will later be detailed with reference to several figures of the accompanying drawing, we have now analysed that the remaining low frequency jitter component is inevitably produced by a conventional pulse stuff synchronization device.

Briefly describing, the phase lag is monitored in practice by using one each of the write and the read pulse sequences as representatives of the first and the second phases. In other words, the phase lag is sampled at a sampling interval substantially equal to i input bit periods, where i represents the memory capacity of the elastic memory, namely, the number of memory cells. Inasmuch as the effect of sampling is a dominant factor according to our analysis, the remaining low frequency component will be referred to as a sampling jitter component.

SUMMARY OF THE INVENTION

It is therefore an object of the present invention to provide, for a transmitting end of a time division multiplexed digital communication network, a pulse stuff synchronization device capable of reducing the sampling jitter component.

It is another object of this invention to provide a pulse stuff synchronization device of the type described, which improves the performance of the time division multiplexed digital communication network.

It is possible to specify that a pulse stuff synchronization device to which this invention is applicable, is responsive to an input pulse sequence comprising input information pulses at an input bit rate for producing an output pulse sequence comprising output information pulses and stuff pulses in selected ones of consecutive pulse slots defined by a reference clock pulse sequence of an output bit rate higher than the input bit rate. The consecutive pulse slots are divisible into a succession of frames and includes that at least one predetermined pulse slot in each frame in which the output pulse sequence includes a selected one of the output information pulses and the stuff pulses to arrange the input information pulses in the output pulse sequence as the respective output information pulses in synchronism with the reference clock pulse sequence. The device comprises (a) i one-bit memory cells, where i represents a predetermined natural number equal at least to two, (b) means for producing first through i-th write pulse sequences having cyclically retarding first through i-th write pulse phases, respectively, for use in storing the input information pulses cyclically in the memory cells, (c) gapping means responsive to the reference clock pulse sequence and a control pulse produced in one frame for providing a gap between the reference clock pulses at the predetermined pulse slot in a frame next succeeding the above-mentioned one frame to produce a gapped clock pulse sequence in response to successive control pulses, (d) means responsive to the gapped clock pulse sequence for distributing the gapped clock pulses into first through i-th read pulse sequences having cyclically retarding first through i-th read pulse phases, respectively, to produce the first through the i-th read pulse sequences, with the first read pulse phase made to have a phase lag relative to the first write pulse phase, (e) means responsive to the first through the i-th read pulse sequences for cyclically reading as the output information pulses the input information pulses stored in the memory cells, (f) means for sampling phase lags of the first through the i-th read pulse phases relative to the first through the i-th write pulse phases, respectively, to provide sampled phase lags from time to time, (g) phase lag monitoring means coupled to the sampling means for monitoring the sampled phase lags to successively produce stuff demand pulses every time the sampled phase lags decrease below a predetermined threshold, and (h) supplying means for supplying the stuff demand pulses as the successive control pulses to the gapping means.

As described hereinabove, the phase lags are sampled at a sampling interval substantially equal to i input bit periods in a conventional pulse stuff synchronization device. For example, the phase lag monitoring means repeatedly monitors merely the phase lag of the first read pulse phase relative to the first write pulse phase. The output pulse sequence is subject to a jitter component named a sampling jitter component hereinabove. Incidentally, the number i of the memory cells is rendered equal to an integral multiple of two, such as eight, in a conventional pulse stuff synchronization device.

According to this invention, the above-specified pulse stuff synchronization device is provided with means for reducing the jitter component in question.

According to an aspect of this invention, the jitter component reducing means is implemented by selecting a prime number as the predetermined natural number.

According to another aspect of this invention, several of the first through the i-th write pulse sequences are selected. Corresponding read pulse sequences, namely, the read pulse sequences having the same serial numbers, are also selected. The phase lag monitoring means monitors the phase lags of read pulse phases of the selected read pulse sequences relative to write pulse phases of the corresponding write pulse sequences. The number i need no more be prime. It is possible to use all write and read pulse sequences as the "selected" write and read pulse sequences.

According to still another aspect of this invention, a random pulse generator is used in randomizing the sampling interval. It is possible to equivalently randomize the sampling interval. In both random processes, the predetermined natural number i may or may not be prime.

BRIEF DESCRIPTION OF THE DRAWING

FIGS. 16A and B show locii of the phase lag $T_1^N$ averaged over each stuff period of thirty-three frame periods for two cases in which the input bit rates of 2,048,001 Hz and 2,047,999 Hz are used for the nominal higher order bit rate of 8,448,000 Hz, in calculating the serial number n by the use of the flow chart depicted in FIG. 15;

DESCRIPTION OF THE PREFERRED EMBODIMENTS

Figure 1:
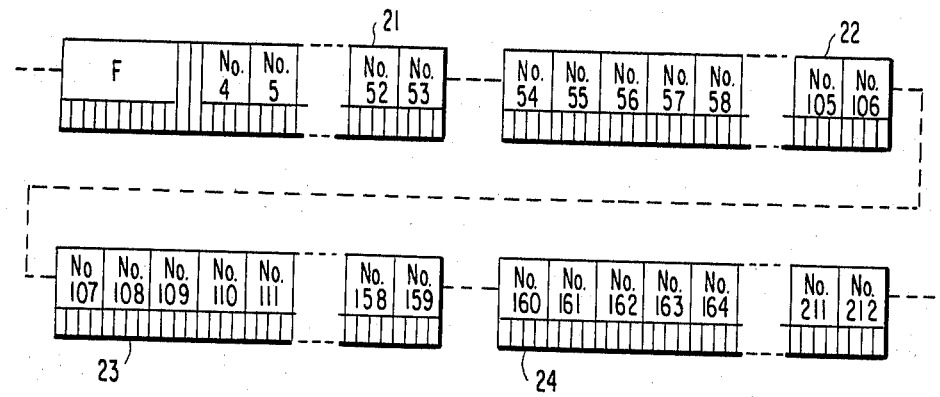
FIG. 1 shows a frame of a higher order pulse sequence of a higher order bit rate into which four plesiochronous input pulse sequences of an input bit rate are time division multiplexed after converted by a pulse stuff synchronization device to four synchronous output pulse sequences of an output bit rate equal to a quarter of the higher order bit rate, respectively.

Referring to FIG. 1, a part of CCITT (International Telegraph and Telephone Consulative Committee) Recommendation G 742 will be described at first in order to facilitate an understanding of the present invention. According to the illustrated part, four first (primary) order plesiochronous pulse sequences are time division multiplexed by a multiplexer (not shown) into a second order pulse sequence. Each frame of the second order pulse sequence has eight hundred and forty-eight consecutive second order bit positions divisible into first through fourth quarter frames 21, 22, 23, and 24, each having two hundred and twelve consecutive bit positions. Dashed lines indicate continuity of the quarter frames 21 through 24 and the frames. First through tenth bit positions are for a frame alignment signal F of ten binary bits or pulses 1111010000. An eleventh bit position is for an alarm indication signal. A twelfth bit position is for future use. Four successive ones of the eight hundred and thirty-six remaining bit positions are used as a block for the respective first order sequences. Each block is generally for four bit-interleaved input information bits or pulses of the respective first order pulse sequences, one from each first order pulse sequence, as will presently be described in detail.

In order so to multiplex the first order pulse sequences, a pulse stuff synchronization device is supplied with each first order pulse sequence as an input pulse sequence and produces an output pulse sequence as has already been described heretobefore and will be detailed in the following. Four such devices are used for the respective first order pulse sequences. It is possible to understand that the first through the twelfth second order bit positions correspond to first through third blocks (not indicated by the serial numbers in the figure). The blocks for the respective first order pulse sequences are therefore numbered from No. 4 to No. 212. The No. 54, No. 107, and No. 160 blocks are for the above-described stuff control pulses of the respective output pulse sequences. The No. 161 block is for the variable pulses of the respective output pulse sequences. Two hundred and five remaining blocks are exclusively for the output information pulses.

The first order bit rate, herein called the input bit rate, and the second order bit rate will be designated by $f_I$ and $f_H$. The bit rates are:

$$f_I = 2{,}048{,}000 \text{ Hz} \pm 50 \text{ ppm}$$

and $$f_H = 8{,}448{,}000 \text{ Hz} \pm 30 \text{ ppm,}$$

respectively. The reference clock rate, namely, the output bit rate, is equal to the second order bit rate divided by four. If denoted by $f_O$, the output bit rate is nominally:

$$f_O = 2{,}112{,}000 \text{ Hz.}$$

Figure 2:
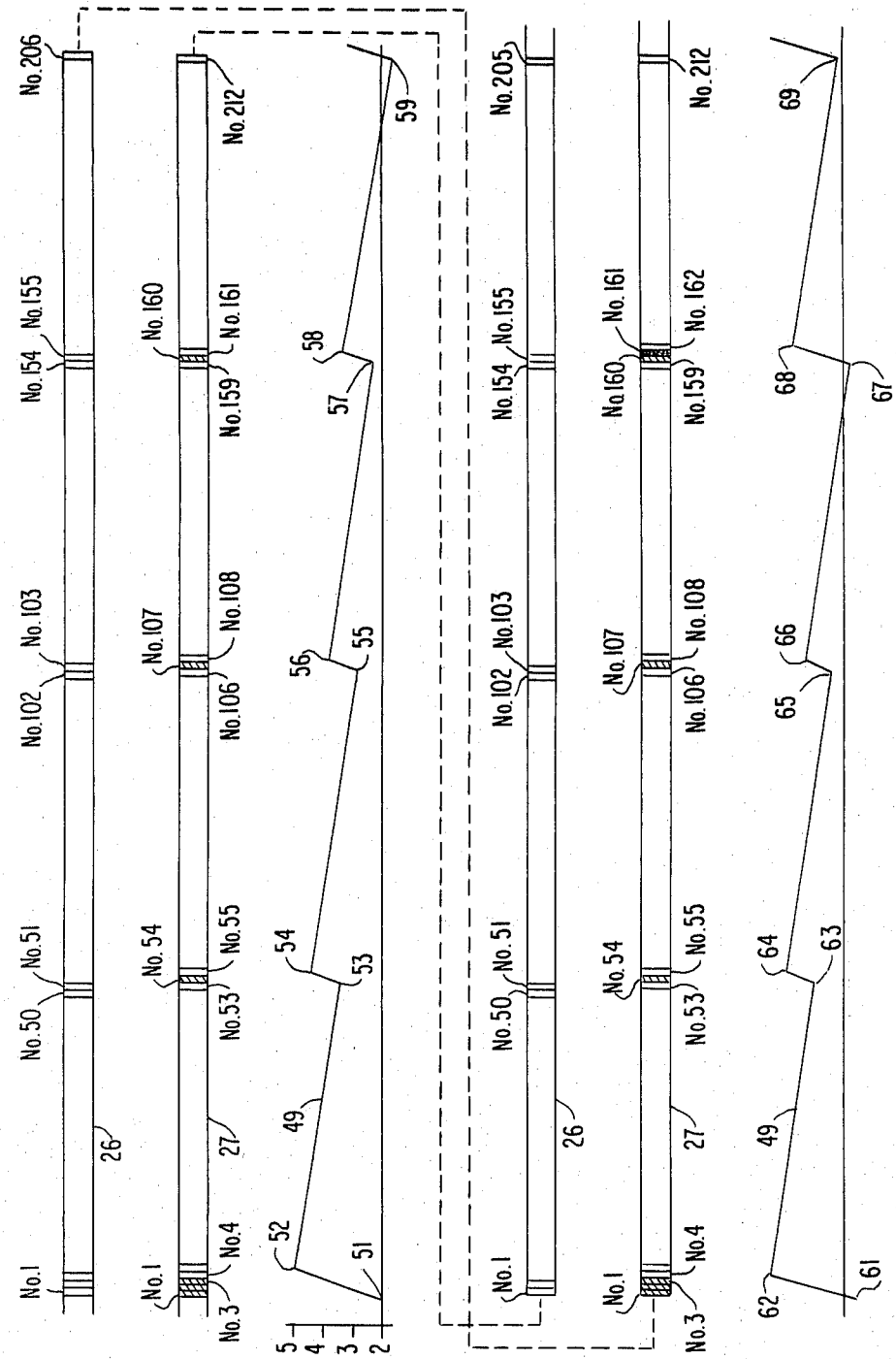
FIG. 2 shows input information pulses of one of the input pulse sequences to be stored in an elastic memory of a pulse stuff synchronization device by write pulse sequences having a first phase, those pulse slots of one of the output pulse sequences which are divisible into a succession of frames and into most of which the input information pulses are read out of the elastic memory by read pulse sequences having a second phase, and a phase lag of the second phase relative to the first phase.

Turning to FIG. 2 for a short while, an input pulse sequence 26 has a succession of input information pulses, each placed in an input bit position having a duration or width called an input bit period. Merely for convenience of the description that follows, the input information pulses or bit positions are serially numbered either from No. 1 to No. 206, or from No. 1 to No. 205. Each frame of an output pulse sequence 27 has No. 1 through No. 212 pulse slots, each having an output bit period. The No. 1 through No. 3 hatched pulse slots are for insertion of the service pulses on multiplexing such output pulse sequences. The No. 54, No. 107, and No. 160 pulse slots indicated with hatches, are for the stuff control pulses. The No. 161 pulse slot is the variable slot for a variable pulse, namely, either an output information pulse or a stuff (dummy) pulse. Other pulse slots are exclusively for the output information pulses. The pulses may be specified by the serial numbers for the pulse slots in which the respective pulses are situated.

Figure 3:
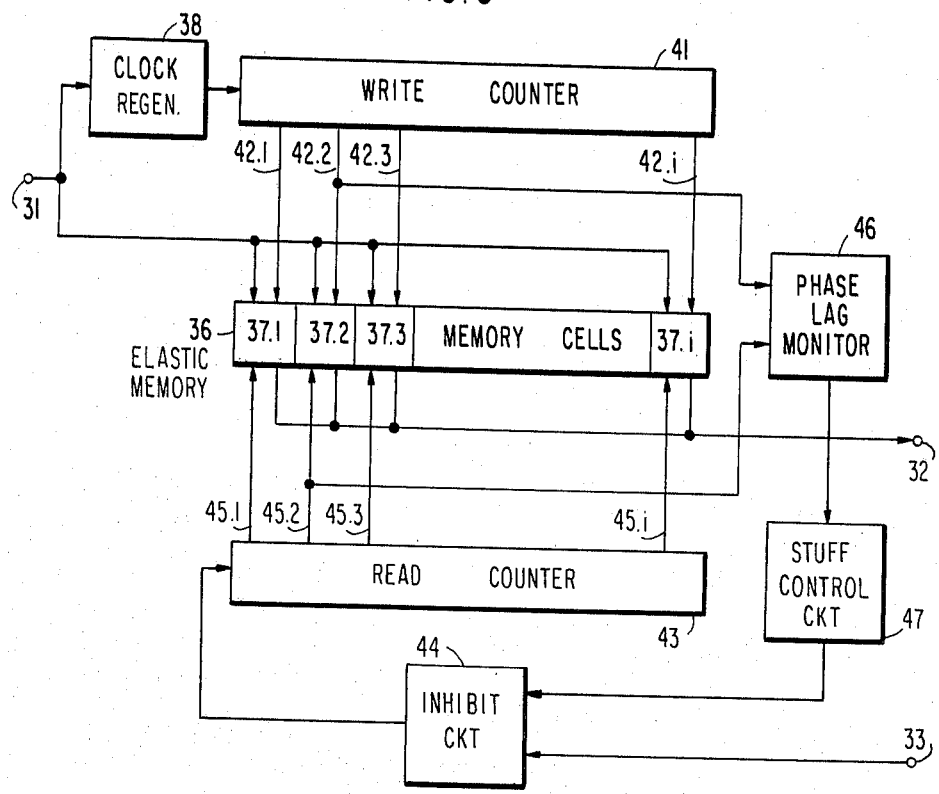
FIG. 3 is a block diagram of a pulse stuff synchronization device according to a first embodiment of the instant invention.
Figure 5:
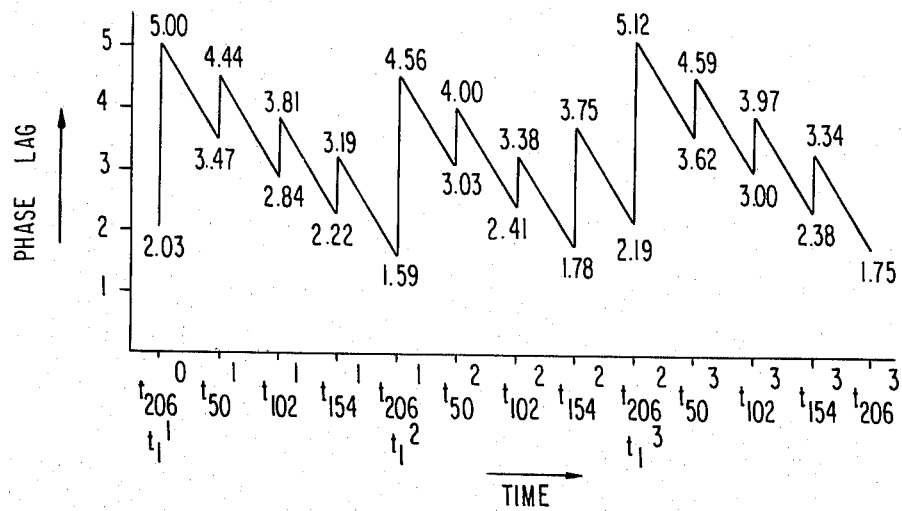
FIG. 5 shows the phase lag with the time axis scaled by serial numbers $t_x^N$ assigned to gapped pulse slots, where N represents the serial number for the frames and x, the serial number for the gapped pulse slots in each frame.

Referring now to FIG. 3, a pulse stuff synchronization device according to a first embodiment of this invention is similar in structure, insofar as the device is depicted by such a block diagram, to a conventional pulse stuff synchronization device as, for example, that described in the Brigham et al article with reference to FIGS. 3 and 5 (a) and (b) thereof. The device comprises a pulse sequence input terminal 31 for an input pulse sequence (illustrated in FIG. 2 at 26), a pulse sequence output terminal 32 for an output pulse sequence (27 in FIG. 2), and a reference clock input terminal 33 for a reference clock pulse sequence. If the service slots should be taken into consideration, the reference clock pulse sequence is concurrently supplied to the reference clock input terminals of the four stuff synchronization devices with the reference clock pulses indicative of the service slots preferably preliminarily removed.

The input pulse sequence delivered to the terminal 31 is supplied to a memory 36 having first through i-th one-bit memory cells 37.1, 37.2, 37.3, . . . , and 37.i and also to a clock regenerator 38 for recovering an input clock pulse sequence from the input pulse sequence. When an input pulse stream supplied to the device is a bipolar pulse stream as in the case of PCM communication, the terminal 31 should be supplied with the input pulse stream through a bipolar-to-unipolar converter (not shown).

The recovered input clock pulse sequence is distributed by a write counter 41 cyclically into first through i-th write pulse sequences 42.1, 42.2, 42.3, . . . , and 42.i having first through i-th wire pulse phases, cyclically retarding by one input bit period, for use in accessing the respective memory cells 37.1 through 37.i to store consecutive input information pulses, i in number at a time, in the respective memory cells 37.1 through 37.i. The memory 36 therefore has a memory capacity of i bits. Each memory cell retains the input information pulses supplied thereto nearly during i input bit periods. The reference clock pulse sequence is supplied to a read counter 43 through an inhibit circuit 44, which is normally open as will shortly become clear. The read counter 43 distributes the reference clock pulse sequence into first through i-th read pulse sequences 45.1, 45.2, 45.3, . . . , and 45.i having first through i-th cyclically retarding read pulse phases. Each counter, as called herein, may be a binary counter, a ring counter, or a similar counter and serves as a distributor or divider.

Read pulses of one of the read pulse sequences 45.1 through 45.i usually build up one output bit period later than the pulses of the next preceding read pulse sequence. Cyclic retardation of the read pulse sequences 45.1 through 45.i is therefore usually by one output bit period. Referring to the numerical example, a read pulse sequence is produced at the No. 4 pulse slot (FIG. 2) with a gap of three output bit periods. Read pulse sequences are produced at the No. 55 and No. 108 pulse slots with a gap of one output bit period. Likewise, a gap of one output bit period is usually formed in a read pulse sequence at the No. 160 pulse slot. When a stuff pulse is to be located in the No. 161 pulse slot, the read pulse sequence has a gap of two output bit period at the Nos. 160 and 161 pulse slots. The cyclic retardation thus transiently varies when expressed in terms of the output bit period. The transient retardation, however, returns to a stationary retardation of one output bit period in i output bit periods.

Cyclically addressed by the read pulse sequences 45.1 through 45.i with gaps positioned here and there, the memory cells 37.1 through 37.i produce the stored input information pulses from time to time as output information pulses, respectively. The memory 36 thus serves as an elastic memory.

The output bit rate defined by the reference clock pulse sequence is higher than the input bit rate. The service slots are only six in each frame and the information slots, two hundred and six. The write pulse phases would therefore be caught up with by the read pulse phases even with the reference clock pulses specifying the service slots removed before distribution of the reference clock pulse sequence. Should this occur, an input information pulse stored in a certain memory cell would twice be read out. In order to avoid the repeated read out, the first read pulse phase should always have a phase lag relative to the first write pulse phase. The variable slots (the No. 161 pulse slots in some of the frames) are filled with stuff pulses, instead of output information pulses, when the pulse lag decreases below a predetermined threshold, such as two input bit periods. It does not mean loss of generality in view of the precyclic retardation of the write and the read pulse phases to use the phase lag as a representative of phase lags of the read pulse phases relative to the respective write pulse phases.

The phase lag is monitored by a phase lag monitor 46, which is known in the art and may be a phase comparator for carrying out comparison between the write and the read pulse phases to find out the phase lags, preferably timed by the respective write pulse sequences, and then for comparing the phase lags with the threshold. When the representative phase lag decreases below the threshold at a monitor slot of the output pulse sequence, one in each frame, and consequently of the reference clock pulse sequence, the phase lag monitor 46 produces a stuff demand pulse. The monitor slot will later be discussed in detail.

In order to provide the representative phase lag, one of the write pulse sequences 42.1 through 42.i and one of the read pulse sequences 45.1 through 45.i are selected and supplied to the phase lag monitor 46. The selected write pulse phase should always lead the selected read pulse phase. For convenience of the following description, the second write and read pulse sequences 42.2 and 45.2 will be selected. With this, the phase lags of the read pulse phases relative to the respective write pulse phases are sampled at a sampling interval of i input bit periods as sampled phase lags from time to time.

Responsive to the stuff demand pulse, a stuff control circuit 47, known in the art, makes the stuff control pulses in the next following frame indicate appearance of a stuff pulse and supplies an inhibit pulse to the inhibit circuit 44 at the variable slot (the No. 161 pulse slot) in the next subsequent frame. The inhibit circuit 44 inhibits the reference clock pulse sequence during one output bit period to form a gap in the output pulse sequence for insertion of a stuff pulse therein. Each read pulse sequence is thereby given a gap of one more output bit period (two output bit periods in total). Each read pulse phase is transiently retarded one more output bit period. The phase lag is transiently rendered nearly one more input bit period greater. The stuff control circuit 47 will be described a little more in detail in the following when the more detailed structure becomes necessary in describing another embodiment of this invention.

The memory capacity of the elastic memory 36 is determined in consideration of the factors to be presently described. In a conventional stuff synchronization device, an integral multiple of two is usually selected as the capacity. Typical capacity is eight bits. The factors are (1) a gap for the three consecutive service slots, (2) a gap of each stuff control slot, (3) a gap for each stuff pulse, (4) jitter in the input pulse sequence, (5) the waiting time jitter component described hereinabove, and (6) tolerances for the circuitry.

Figure 4:
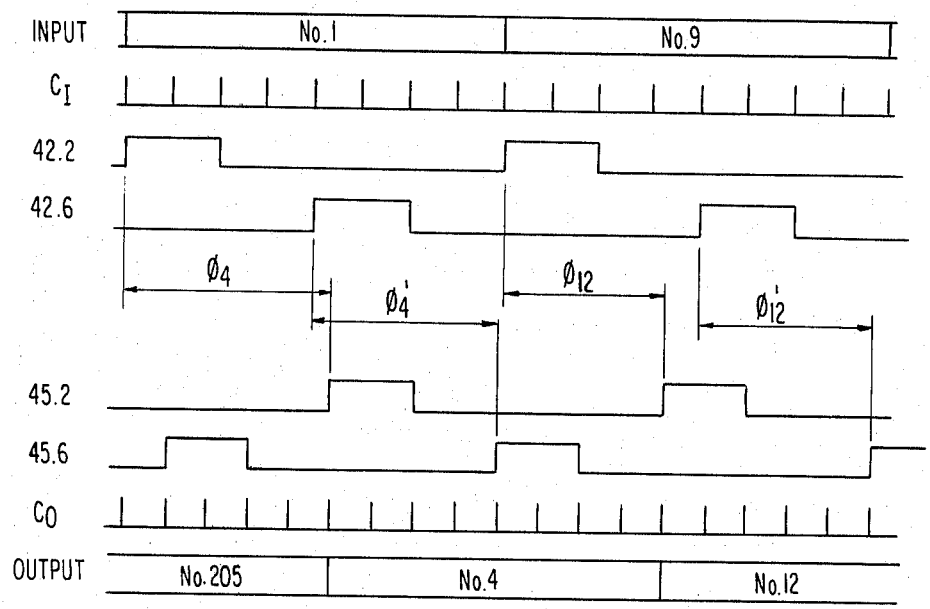
FIG. 4 shows a few signals used in the device depicted in FIG. 3, together with a few more signals used in a pulse stuff synchronization device according to another embodiment of this invention.

Turning to FIG. 4, the input and the reference clock pulses are illustrated at $C_I$ and $C_O$ with the difference between the input and the output bit rates exaggerated. One of the write pulse sequences that is supplied to a certain memory cell, is depicted at 42.2. It is assumed that the memory capacity is eight bits and that the input information pulses are stored in the memory cells 37.1 through 37.8 at the leading edge of each write pulse. The write pulses of each sequence load the memory cell under consideration with every eighth input information pulse. The Nos. 1 and 9 input information pulses are depicted. Read pulses of the sequence supplied to the memory cell in question are exemplified at 45.2. Presuming that the stored information pulses are successively read out at the leading edge of each read pulse, the Nos. 1 and 9 input information pulses are read out as the Nos. 4 and 12 output information pulses, respectively. Due to a gap for the three consecutive service slots, the output information pulse read out by the read pulse sequence 45.2 next prior to the No. 4 output information pulse, is the No. 205 output information pulse in the next previous frame. The phase lag at leading edges of the Nos. 4 and 9 pulse slots varies as indicated at $\phi_4$ and $\phi_9$. Because of a gap of one output bit period in each read pulse sequence, the Nos. 51 and 103 input information pulses stored in some of the memory cells 37.1 through 37.8 are read out as the Nos. 55 and 108 output information pulses, rather than as the Nos. 54 and 107 output information pulses, respectively.

Turning back to FIG. 2, the phase lag varies as approximated by a broken or polygonal line 49 on a scale shown on the left side in terms of the input bit period. The phase lag is rendered a little greater than two input bit periods at the No. 212 pulse slot (not shown) of a next preceding frame of the output pulse sequence 27 as indicated at a first vertex 51 of the polygonal line 49. The phase lag monitor 46 (FIG. 3) produces no stuff demand pulse. The variable pulse to be placed in the No. 161 pulse slot of the first illustrated frame should therefore be an output information pulse rather than a stuff pulse. The phase lag at the vertex 51 is so surmised that the phase lag grows, due to the No. 1 through No. 3 pulse slots for the three consecutive service pulses, to five input bit periods as shown at a second vertex 52 at the No. 4 pulse slot. Let the elastic memory 36 be so designed that the No. 1 input information pulse of the input pulse sequence 26 be read out as an output information pulse at the No. 4 pulse slot by a certain one of the read pulse sequences 45.1 through 45.i that has a phase lag of the five input bit periods. It should be understood in this event that the output pulse sequence 27 should be shifted rightwards by about two output bit periods.

The phase lag decreases to about 3.5 input bit periods at a third vertex 53 when the No. 50 input information pulse is read out as an output information pulse at the No. 53 pulse slot. Due to the first control slot at the No. 54 pulse slot, the phae lag increases nearly by one input bit period to about 4.4 input bit periods at a fourth vertex 54 when the No. 51 input information pulse is read out as an output information pulse at the No. 55 pulse slot. In this manner, the phase lag decreases to a fifth vertex 55, grows nearly by one input bit period to a sixth vertex 56, decreases to a seventh vertex 57, increases to an eighth vertex 58 again nearly by one input bit period, and decreases to about 1.6 input bit periods as indicated at a ninth vertex 59. The No. 206 input information pulse is read out as an output information pulse at the No. 212 pulse slot. Inasmuch as the 1.6 input bit periods is less than the threshold, the phase lag monitor 46 produces a stuff demand pulse at the monitor slot of the first frame. A stuff pulse should be placed in the No. 161 pulse slot of the second frame.

The ninth vertex 59 becomes a first vertex 61 for the second frame. The phase lag varies as shown at second through seventh vertices 62, 63, 64, 65, 66, and 67. The phase lag increases nearly two input bit periods at the No. 162 pulse slot to an eight vertex 68 because one reference clock pulse is inhibited by the inhibit circuit 44 for insertion of a stuf pulse, depicted black, in the No. 161 pulse slot. The No. 55 input information pulse is read out as an output information pulse at the No. 162 pulse slot. When the No. 205 input information pulse is read out as an output information pulse at the No. 212 pulse slot, the phae lag decreases to a ninth vertex 69. The next succeeding input information pulse, namely, the No. 1 input information pulse (not shown), is read out as an output information pulse at the No. 4 pulse slot of the third frame (not shown). This is the reason why the input information pulses are numbered as described.

In conjunction with FIGS. 1 through 3, known jitter components may be classified into (1) a first component resulting from periodic insertion of the service pulses, (2) a second component given rise to by the interspersed stuff pulses, and (3) the waiting time jitter component described hereinabove. It is surmised for brevity of description that the input pulse sequences are not subjected to jitter. The first component is a high frequency component. The second component has a peak to peak amplitude of one output bit period. It is known that the waiting time jitter component depends on a stuff or justification ratio g, representative of an average number of stuff pulses in each frame.

When the frame structure is as described heretobefore, the stuff ratio is given by:

$$g = 206 t_I - 212 t_O,$$

where $t_I$ and $t_O$ represent an input and an output bit period. Namely:

$$g = (206 f_H - 848 f_l)/f_H,$$

when represented by the lower and the higher order bit rates. When the bit rates are nominal, the stuff ratio has a nominal value of 14/33, namely, a little greater than 0.4242. This nominal value of the stuff ratio appears also when the bit rates are subjected to certain slips or deviations in the same sense within the tolerances. When the lower and the higher order bit rates reach the highest and the lowest limits of tolerances, the stuff ratio becomes minimum. When the slips are to the lowest and the highest limits, the stuff ratio is rendered maximum. The minimum and the maximum stuff ratios are:

$$g_{min} \approx 0.4078$$

and $$g_{max} \approx 0.4407.$$

The stuff ratio may be represented by:

$$g = q/P + d,$$

where q represents a numerator integer; P, a denominator integer greater than the numerator integer; and d a deviation of the stuff ratio from the integer ratio q/P. It is already known that the frequency of the waiting time jitter component is given by $dP/t_F$, where $t_F$ represents the frame period. The frequency therefore becomes low when the stuff ratio is near to an integer ratio and the denominator integer is small. The peak to peak amplitude of the waiting time jitter component is given by 1/P. The amplitude becomes greater if the denominator integer is less. It is therefore important to calculate the stuff ratios equal to integer ratios in which the denominator integers are small, such as less than about fifty.

Table given hereunder shows such integer ratios, together with approximate values (exact for Nos. 14 and 15) in decimal fractions. The lower and the higher order bit rates and consequently the input and the output bit rates at which the stuff ratio becomes one of the listed integer ratios will be called crictical bit rates, the nominal bit rates inclusive. As will become clear later, a stuff ratio becomes equal to an integer ratio other than 14/33, even when one of the input and the output bit rates is nominal.

TABLE

| No. | Integer ratio | Approximate value |
|-----|---------------|-------------------|
| 1   | 9/22          | 0.4091            |
| 2   | 7/17          | 0.4118            |
| 3   | 19/46         | 0.4130            |
| 4   | 12/29         | 0.4138            |
| 5   | 5/12          | 0.4167            |
| 6   | 13/31         | 0.4194            |
| 7   | 8/19          | 0.4210            |
| 8   | 19/45         | 0.4222            |
| 9   | 11/26         | 0.4231            |
| 10  | 14/33         | 0.4242            |
| 11  | 3/7           | 0.4286            |
| 12  | 13/30         | 0.4333            |
| 13  | 10/23         | 0.4348            |
| 14  | 7/16          | 0.4375            |
| 15  | 11/25         | 0.4400            |

Referring to FIG. 5, the phase lag is again illustrated in preparation for analysis of a low frequency jitter component, such as the waiting time jitter component. The time axis is scaled by instants $t_x^N$ in an N-th frame, where x represents the serial number of the pulse slots in the N-th frame with the service slots removed and renumbered from No. 1 to No. 206 as gapped pulse slots in contrast to ungapped pulse slots numbered from No. 1 to No. 212. The No. 1 pulse slot $t_1^N$ of the N-th frame therefore next follows the No. 206 pulse slot $t_{206}^{N-1}$ of the next preceding (N-1)-th frame. More exact values of the phase lag are written at vertices of a polygonal line for a case where the input and the second order bit rates are given their respective nominal values and the threshold is set at two input bit periods. As will be seen from the more exact values, the phase lag decreases below the threshold at the trailing end portion of the third quarter frame of the second frame. The decrease, however, should not make the phase monitor 46 produce the stuff demand pulse. In other words, the monitor slot should not be present in such quarter frames.

Figure 6:
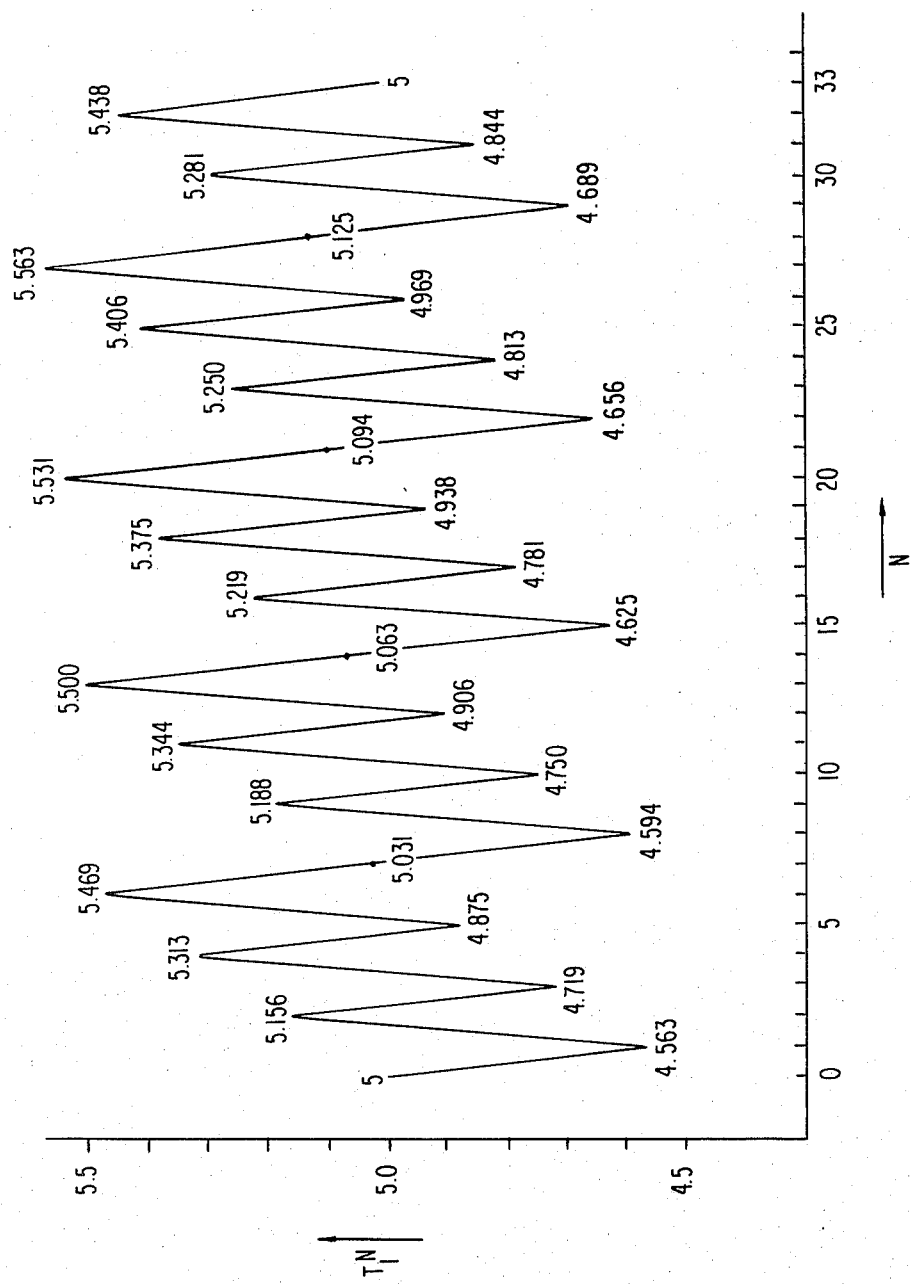
FIG. 6 shows a locus of a phase lag $T_1^N$ at the pulse slots $t_1^N$, for use in exhibiting a stuff period for a case in which the higher order and the input bit rates are nominally 8,448,000 Hz and 2,048,000 Hz, with the time axis scaled by the serial number N that is less by one than the serial number used for the frames in FIG. 5.
Figure 7:
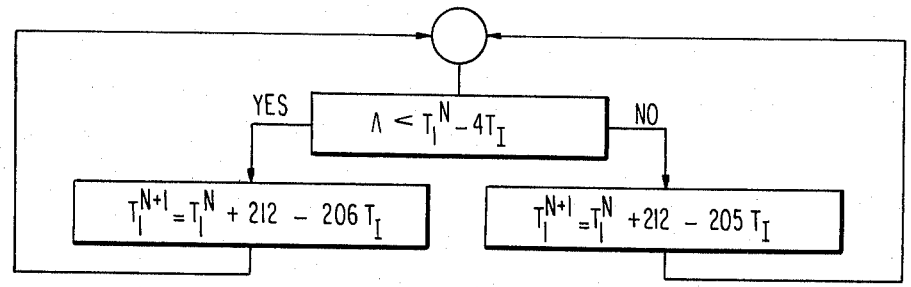
FIG. 7 shows a flow chart for use in calculating the locus depicted in FIG. 6.

Turning to FIGS. 6 and 7, it is possible to analyse the low frequency jitter component by using a locus or track of the phase lag at the No. 1 pulse slot $t_1^N$ as a representative of the varying phase lag. It is surmised that the phase lag were monitored with all write and read pulse sequences 42.1 through 42.i and 45.1 through 45.i taken into consideration rather than with the phase lags sampled. The locus is calculated, when the (N-1)-th frame includes no stuff pulse and the stuff pulse, according to:

$$t_1^N = t_1^{N-1} + 212 t_O - 206 t_I$$

and $$t_1^N = t_1^{N-1} + 212 t_O - 205 t_I,$$

respectively. The analysis is carried out by tracing the wave form of the locus. A periodic variation, similar to standing wave, will appear in the wave form. Observation of the standing wave is important for the analysis as will become clear as the description proceeds.

The phase lag may be normalized by the output bit rate and designated by $T_1^N$. The normalized phase lag is given by:

$$T_1^N = t_1^N \times f_O,$$

where the serial number N for the frames is less by one than that used heretobefore. It is possible to calculated the locus of the normalized phase lag by the use of a flow chart illustrated in FIG. 7, where $\Lambda$ represents the trheshold and $T_I$:

$$T_I = t_I \times f_O,$$

namely, a normalized input bit period. The process defined by the flow chart is carried out by the phase lag monitor 46 in practice.

The locus of the normalized phase lag calculated for the nominal values of the input and the second other bit rates according to the flow chart, is depicted in FIG. 6 with five and two input bit periods given to the phase lag $T_1^O$ and the threshold, respectively, as the initial condition. The more exact values of the calculated phase lag are again written at the respective vertices in terms of the input bit period. The locus shows a standing wave of a relatively short wavelength of thirty-three frame periods $33 t_F$. This results from the fact that the stuff ratio is equal to 14/33, namely, the fact that fourteen stuff pulses are interspersed in a duration of thirty-three frames. Incidentally, the average value of the phase lag $T_1^N$ for this case is 5.05746 input bit periods. Such a wavelength is herein called a "stuff" period.

The stuff period becomes more distinct when the denominator integer of the stuff ratio is less. If a slip of one through several bits/second occurs in one or each of the input and the second order bit rates from their respective critical values, the stuff period fluctuates. As a result, something like a beat appears in the stuff period. This results, in turn, in a relatively low frequency jitter component. When the stuff ratio is equal to 14/33, the relatively low frequency jitter component has a frequency of about 33 Hz and a peak to peak amplitude of the order to 0.03 bit period.

Figure 8:
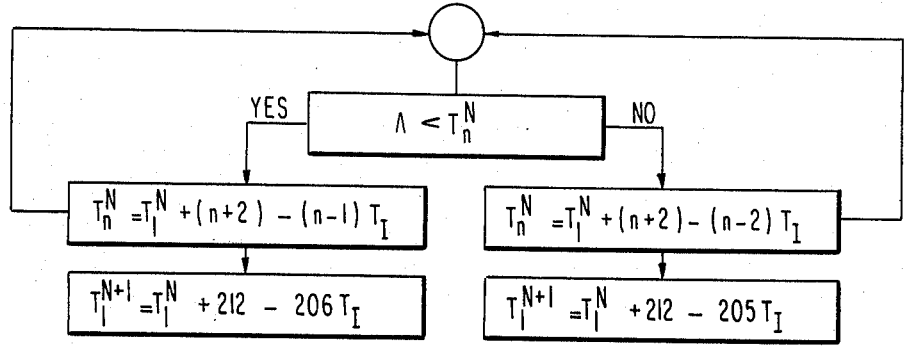
FIG. 8 shows a flow chart for calculating a locus of the phase lag $T_1^N$ with attention directed to the fact that the varying phase lag is monitored with the phase lag sampled at a sampling instant at those n-th pulse slots $t_n^N$ in the respective frames which are spaced by a multiple of the sampling interval.

Referring now to FIG. 8, attention will be directed to the fact that the phase lag is monitored in practice by using the samples of the write and the read pulse phases. In view of the sampling, it becomes necessary to take the position of the monitor slot in each frame into consideration. The monitor slot falls between the No. (206−i+1) and the No. 206 pulse slots, but inclusive, when the pulse slots are renumbered as described. Let the monitor slot be an n-th pulse slot. The flow chart shown in FIG. 7 should now be corrected as depicted herein, where $T_n^N$ represents the normalized phase lag at the monitor slot, namely, at the n-th pulse slot.

The phase lag monitor 46 therefore monitors the sampled phase leg usually in a monitor slot that is incoincident with the No. 206 pulse slot. This is equivalent to an increase of about 0.031 input bit period at most in the threshold because the slope of the line depicted in FIG. 5 between the No. 154 and No. 206 pulse slots $t_{154}^N$ and $t_{206}^N$ is about 0.03 input bit period per pulse slot. The increase differs from frame to frame and tends to reduce the phase lag averaged over several frame periods. The stuff period also fluctuates.

If the phase lag monitor 46 is timed by the respective pulse slots, the sampling interval overspanning the No. 1 through No. 3 unrenumbered pulse slots is (i+3) output bit periods long. With the pulse slots renumbered, it is possible to understand that the sampling interval is always i output bit periods long. As will later be described with reference to numerical examples, let a remainder be calculated by dividing the number of information slots in each frame by the number i representative of the sampling interval in terms of the output bit period. The remainder be multiplied, on the one hand, by the number of frames having no stuff pulses in each stuff period and, on the other hand, by the number of frames having the stuff pulses, respectively. A sum S of the products is equal to:

$$S = \{([X/i]+1) \times i - X\} \times Y + Z,$$

where X represents the number of information slots in each frame; a pair of brackets [], the Gauss' notation; Y, the stuff period in terms of the frame period; and Z, the number of stuff pulses in the stuff period.

If the sum S is equal to an integral multiple of i, the sampling interval is synchronized with the stuff period. In other words, the sampling interval and the stuff period are put in a synchronized state.

When the sum S is not equal to an integral multiple of the sampling interval, the sampling is put out of synchronism with the stuff period. Even in this event, the sampling interval may be in synchronism with a very long period, such as scores of the stuff periods. The standing wave of a relatively short wavelength will disappear. A standing wave of a very long wavelength and an appreciable loop amplitude will, however, appear in the locus of the phase lag. The latter standing wave gives rise to a jitter component having a very low frequency of, for example, about 4 Hz.

It may seem that the use of phase lag samples is already taken into account on analysing the waiting time jitter component. The fact is, however, that consideration is directed mainly to the stuff period as though no care were taken of the sampling interval. No one has thus ever analysed that fluctuation of the stuff period would result in a longer-wavelength standing wave. In other words, no one has ever analysed the sampling jitter component as herein named.

Figure 9:
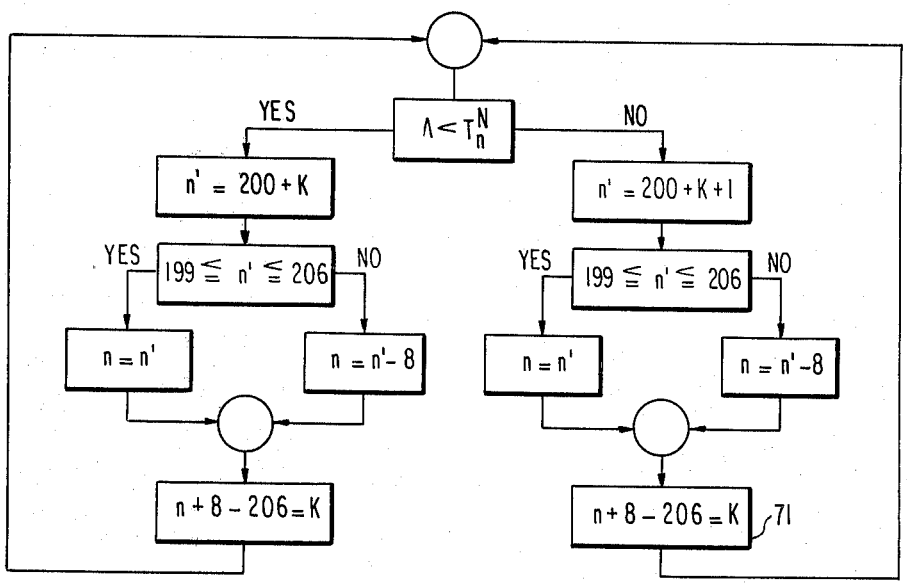
FIG. 9 shows a flow chart for calculating the serial number n for the n-th pulse slots when the sampling interval is equal to eight input bit periods.

Turning to FIG. 9, the monitor slot falls between the No. 199 and No. 206 pulse slots, both inclusive, when the memory capacity is set at the typical value of eight bits. Inasmuch as two hundred and six is less by two than the nearest integral multiple of eight, the serial number n increases two pulse slots in a frame next succeeding a frame in which no stuff pulse is inserted and one more pulse slot (three pulse slots in total) in a frame immediately following a frame in which the stuff pulse is present. A flow chart for calculating the serial number n is illustrated herein. In the flow chart, K is calculated in the step indicated at 71 and is variable from unity to the memory capacity i. The monitor slot as temporarily calculated for a next subsequent frame is denoted by n'. The serial number n varies with a period dependent on the sampling interval, frame period, and stuff ratio.

When the stuff ratio has the nominal value of 14/33, pulse stuffing is carried out fourteen times per stuff period as pointed out hereinabove. When merely summed up, the increase in the serial number n amounts to $2 \times 33 + 14 = 80$. Inasmuch as the increase of eighty pulse slots is an integral multiple of the sampling interval, the serial number n in a particular fram eis again taken by the monitor slot in another frame that is thirty-three frame periods later than the particular frame. In this event, the sampling interval is in synchronism with the stuff period of thirty-three frame periods as described heretobefore in conjunction with the sum S.

Is is possible to understand the effect of a deviation in the stuff period on the synchronism by tracing how the normalized phase lag $T_1^N$ averaged over each stuff period, namely;

$$\left( \sum_{N=0}^{32} T_1^N \right) / 33,$$

varies from a stuff period to another when either or each of the input and the second order bit rates has a slip from the critical values that give the stuff ratio under consideration. Trancing a locus of the average value is equivalent to observing a low frequence component of the variation in the respective normalized phase lags. In other words, the trace is equivalent to observation of the wave form of a low frequency jitter component that might appear at the output of the phase lock loop used in a demultiplexer at a receiving end.

Figure 10A:
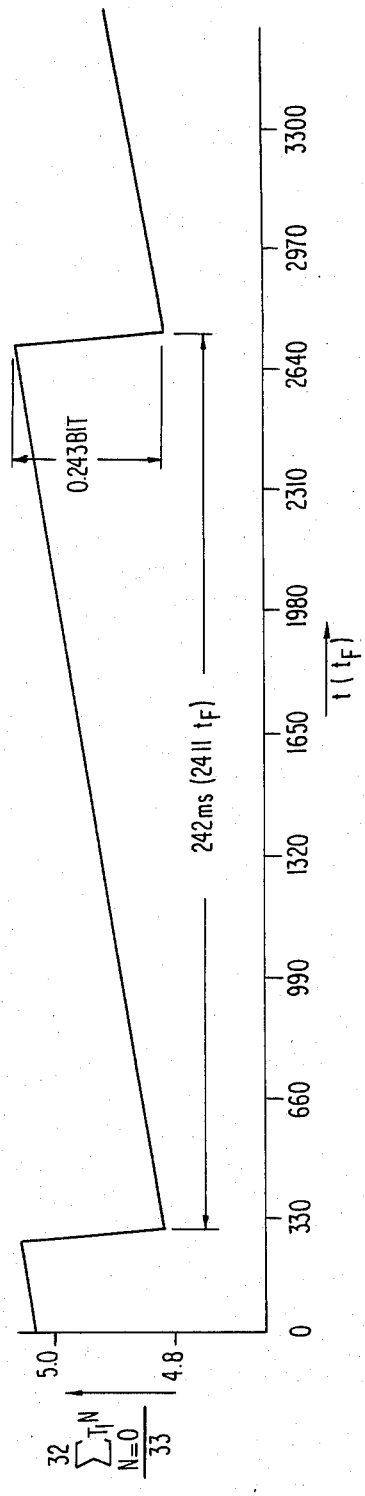
FIGS. 10 A and B show locii of the phase lag $T_1^N$ averaged over each stuff period of thirty-three frame periods for two cases in which the input bit rates of 2,048,001 Hz and 2,047,999 Hz are used for the nominal higher order bit rate of 8,448,000 Hz, in calculating the serial number n by the use of the flow chart illustrated in FIG. 9.
Figure 10B:
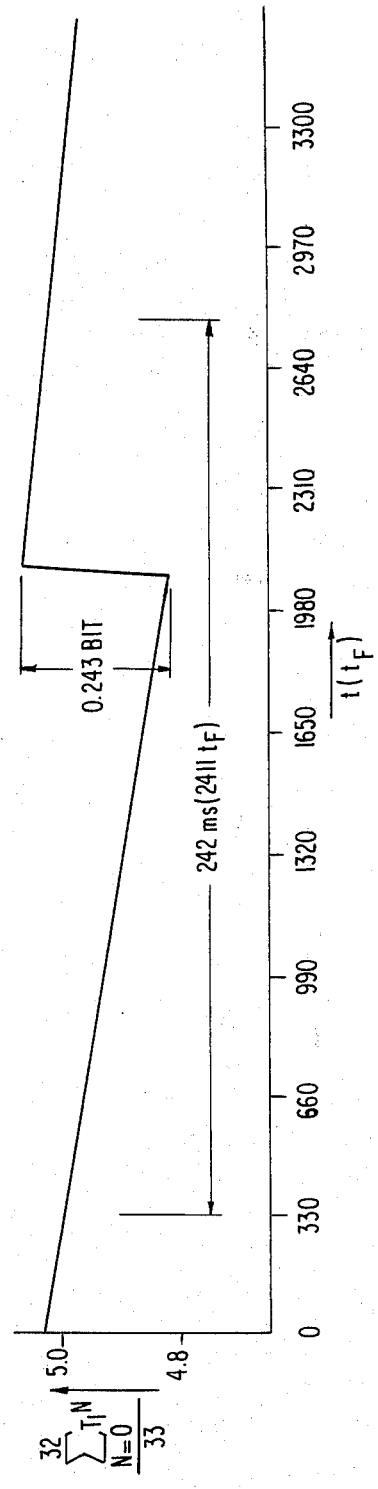

Referring to FIGS. 10 A and B, the average values of the normalized phase lag $T_1^N$ are calculated for the respective stuff periods by the use of an electronic digital computer according to the flow chart illustrated in FIG. 8 with the serial number n for the monitor slots calculated according to the flow chart depicted in FIG. 9. The phase lag is shown in terms of the input bit period. The time axis is scaled by the frame period $t_F$, rather than by the stuff period, for ease of comparison with similar locii to be described in the following. FIG. 10 A shows a locus of the average value for a case in which the second order bit rate has the nominal value of 8,448,000 Hz and the input bit rate, 2,048,001 Hz. When the slip is thus to reduce the stuff ratio, the amplitude of the low frequency jitter component serrasoidally varies with a slow increase and a steep decrease. FIG. 10 B is for another case where the second order bit rate is again nominal and the input bit rate is changed to 2,047,999 Hz to give rise to an increase in the stuff ratio. The serrasoidal variation has a slow decrease and a steep increase. In both cases, the jitter frequency is 4.13 Hz. The frequency is very low, being about one-eighth of the known frequency of the waiting time jitter component. The peak to peak amplitude is 0.243 input bit period, about eight times as great as the known peak to peak amplitude of the waiting time jitter component.

Figure 11:
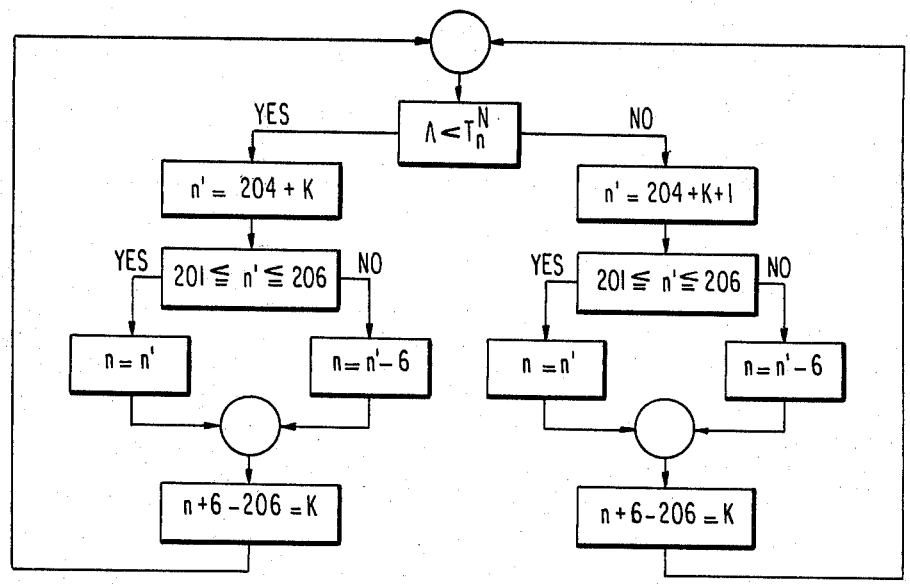
FIG. 11 shows a flow chart for calculating the serial number n when the sampling interval is six input bit periods long.

Turning to FIG. 11, the serial number n of the monitor slot falls in one of the No. 201 through No. 206 pulse slots when the memory capacity is six bits. The serial number n decreases two and one pulse slots in a frame next following a frame having no stuff pulse and the stuff pulse, respectively. A flow chart for calculating the serial number n is depicted herein.

Referring to the Table, let an integer ratio of 8/19 be selected as the stuff ratio. The input bit rate becomes 2,048,031.777 Hz if the second order bit rate is kept at the nominal value. The stuff period is nineteen frame periods. Inasmuch as pulse stuffing is carried out eight times per stuff period, an integral multiple of size is reached when the increase in the serial number n is merely summed up during the stuff period, as $2 \times 19 + 8 = 30$. The sampling interval is in synchronism with this stuff period. The jitter characteristics will be analysed by tracing from stuff period to stuff period the normalized phase lag averaged over this stuff period, namely:

$$\left( \sum_{N=0}^{18} T_1^N \right) / 19.$$

Figure 12A:
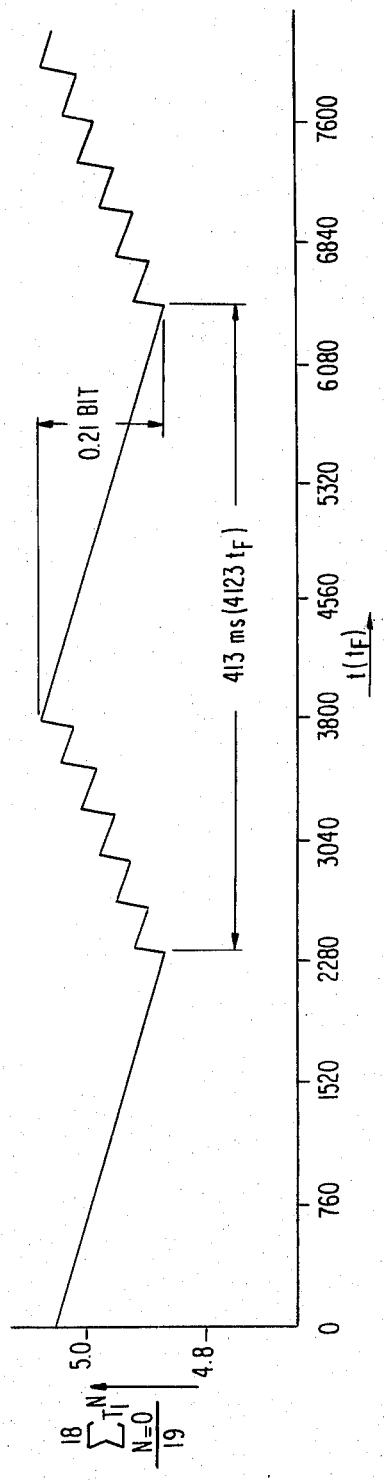
FIGS. 12 A and B show locii of the phase lag $T_1^N$ averaged over each stuff period of nineteen frame periods for two cases where the input bit rates of 2,048,031 Hz and 2,048,033 Hz are used for the nominal higher order bit rate of 8,448,000 Hz, in calculatinhg the serial number n by the use of the flow chart depicted in FIG. 11.
Figure 12B:
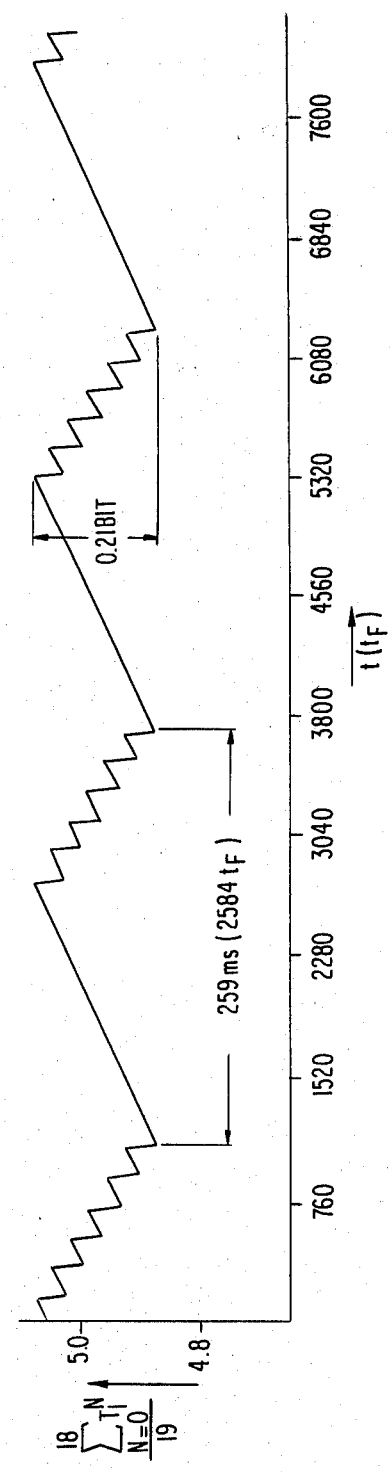

Referring to FIGS. 12 A and B, the average values of the normalized phase lag are calculated for the respective stuff periods by the computer according to the flow charts depicted in FIGS. 8 and 11. FIG. 12 A shows a locus of the average value for a case in which the second order bit rate has the nominal value and the input bit rate, 2,048,031 Hz. The locus serrasoidally varies with a generally steeply increasing portion having six steps, each more steeply rising by 0.05 (about 1/19) input bit period peak to peak. The net peak to peak amplitude is about 0.21 input bit period. FIG. 12 B is for another case where the input bit rate is 2,048,033 Hz. The locus is similar exept for a generally steeply decreasing portion having again six steps. The frequency is about 2.42 Hz in FIG. 12 A and about 3.85 Hz in FIG. 12 B, which frequencies are about one-sixth of the known frequencyof the waiting time jitter component. The net peak to peak amplitude is about six times as great as that known amplitude of the waiting time jitter component which is now 1/19 input bit period.

It is now understood that the sampling interval gives rise to a very low frequency jitter component if the input and/or the second order bit rate deviates from the critical values for a distinct stuff ratio. The frequency is approximately equal to a quotient calculated by dividing the known frequency of the waiting time jitter component by the memory capacity. The peak to peak amplitude amounts to about that of the known waiting time jitter component multiplexed by the memory capacity.

Referring far back to FIG. 3, a prime number is selected as the memory capacity i of the elastic memory 36 in view of the foregoing. The prime number is used also as the common number of the write pulse sequences 42.1 through 42.i and the read pulse sequences 45.1 through 45.i.

Figure 13:
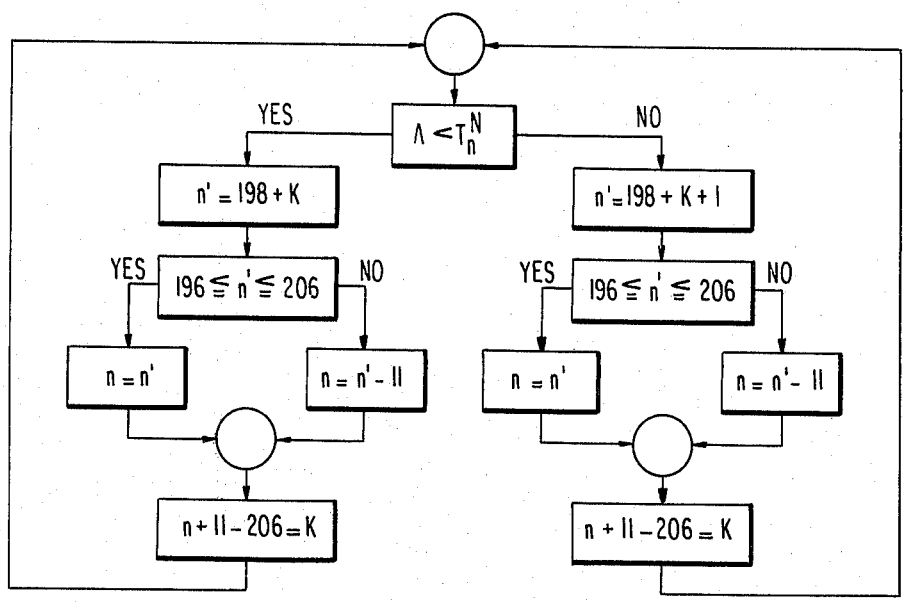
FIG. 13 shows a flow chart for use in calculating the serial number n when the sampling interval is rendered equal to eleven input bit periods.

Turning to FIG. 13, the monitor slot is one of the No. 196 through No. 206 pulse slots when eleven is used as the prime number. Inasmuch as an integral multiple of eleven nearest to two hundred and six is two hundred and nine, the serial number n in a frame is greater by three than that in a next previous frame having no stuff pulse and by four than that in a next preceding frame having the stuff pulse. A flow chart for use in calculating the serial number n is illustrated herein.

The stuff ratio of 14/33 will be again used. The mere sum is given as $3 \times 33 + 14 = 113$, which is different from an integral multiple of eleven. The synchronized state never appears when the stuff ratio is at or near 14/33.

In fact, no jitter was observed at the output of a phase lock loop having a cutoff frequency of a low-pass filter used in the loop at about 20 Hz when the stuff ratio was varied near 14/33. Computer simulation with the stuff ratio varied again near 14/33, showed appearance of a jitter component having a peak to peak amplitude of about 0.1 bit period when the cutoff frequency was set at about 700 Hz. The amplitude decreased to about 0.01 bit period when the cutoff frequency was lowered to about 70 Hz. This proves that the jitter component that would other wise appear, is equivalently scrambled as though the stuff ratio were rendered equal to an irrational number. The effect is similar to the shot effect in a random process.

Referring to FIG. 3 once again, a pulse stuff synchronization device having a memory capacity of seven bits was still objectionable according to the theoretical analysis by the use of the sum S and according to the results of field test by the use of devices actually manufactured. This is because a syncrhonized state occurs when the stuff ratio become equal or nearly equal to 8/19. The above-cited example of eleven-bit memory capacity was also defective when the stuff ratio became to 19/45. This was also the case with a device in which the memory capacity was set at thirteen bits. This is because the syncrhonized state occurs when the stuff ratio is at or near 7/16. The last-mentioned synchronism is, however, readily avoidable by narrowing the tolerances for the input and the second order bit rates, namely, by raising the stability of these bit rates. This is because the stuff ratio of 7/16 is for critical values considerably offset from the respective nominal values. When either of seventeen or nineteen is selected as the prime number, the synchronism does not take place even when the stuff ratio varies throughout the integer ratios listed in the Table, namely, between 9/22 and 11/25.

Figure 14:
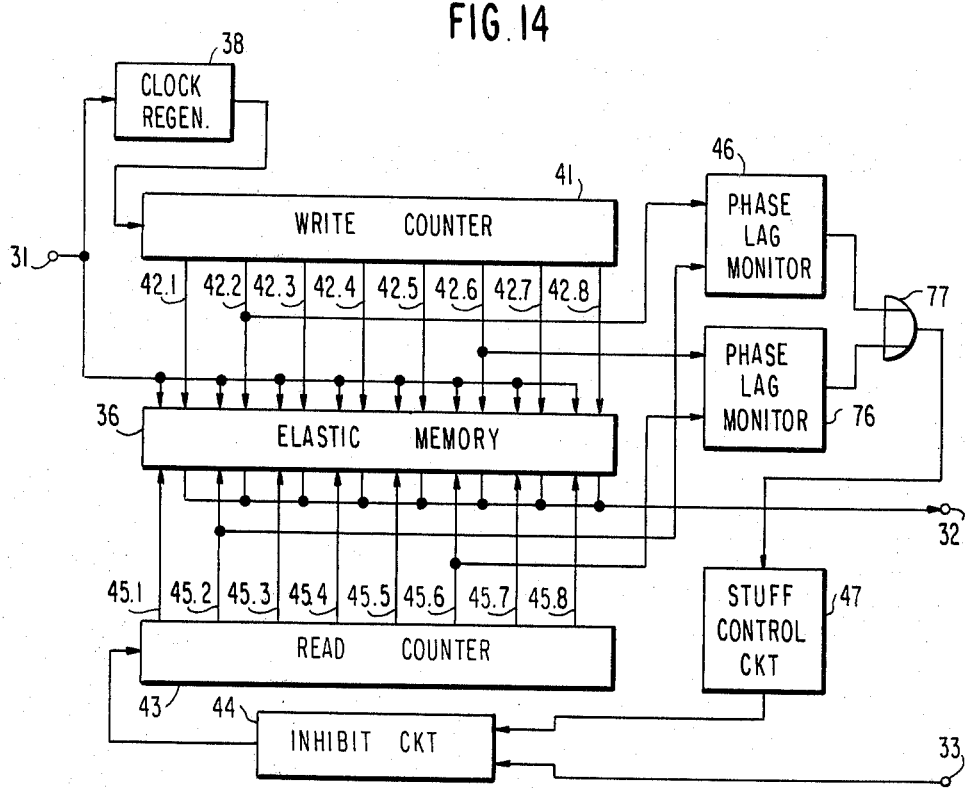
FIG. 14 is a block diagram of a pulse stuff synchronization device according to a second embodiment of this invention.

Referring now to FIG. 14, a pulse stuff synchronization device according to a second embodiment of the invention comprises similar parts designated by like reference numerals. The phase lag monitor 46 will be called a first phase lag monitor and the stuff demand pulse, a first stuff demand pulse. The memory capacity may be given a conventional value. Let the selected write pulse sequence described heretobefore be referred to as a first preselected write pulse sequence and have a first preselected write pulse phase having a phase shift relative to the first write pulse phase in the cyclic order of the write pulse sequences 42.1 through 42.i. Inasmuch as the phase shift is represented in terms of the input bit period, it is possible to say that the first preselected write pulse phase lags behind the first write pulse phase by a first input period in the cyclic order. The phase lag is zero input bit period if the first write pusle sequence is selected as the first preselected write pusle sequence. Similar expressions, such as a first preselected read pulse sequence, a first preselected read pulse phase, and a first output bit period, will be used for the read pulse sequences 45.1 through 45.i. Unless the first read pulse sequence is selected as the first preselected read pulse sequence, the first output bit period may transiently vary from a stationary value when a pulse in the first preselected read pulse sequence next follows a gap for either the service pulse or pulses or the stuff pulse. The transient value, however, returns to the stationary value in i output bit periods as described hereinabove. It is therefore possible to make the first output bit period correspond to the first input bit rate.

Another of the write pulse sequences 42.1 through 42.i that has a second preselected write pulse phase, is selected as a second preselected write pulse sequence. The second preselected write pulse phase lags behind the first write pulse phase by a second input bit period in the cyclic order. Another read pulse sequence having a second preselected read pulse sequence is selected as a second preselected read pulse sequence. The second preselected read pulse phase should lag behind the first read pulse phase in the cyclic order of the read pulse sequences 45.1 through 45.i by a second ouput bit period corresponding to the first input bit period. The preselected read pulse sequences are thus in one-to-one correspondence to the preselected write pulse sequences. The first and the second preselected read pulse phases have a first and a second phase lag relative to the first and the second preselected write pulse phases.

Let the memory capacity be eight bits and the first write and read pulse phases, those had by the first write and read pulse sequences 42.1 and 45.1. When the second write and read pulse sequences 42.2 and 45.2 are used as the first preselected write and read pulse sequences, the first input bit period is equal to one input bit period. The first output bit period should have a stationary value of one output bit period. The second preselected write and read pulse sequences are preferably the sixth write and read pulse sequences 42.6 and 45.6 having phase shifts of i/2 or approximately i/2 input and output bit periods relative to the first preselected write and read pulse sequences 42.2 and 45.2, respectively. The second input bit period is equal to five input bit periods. The stationary value of the second output bit period is five output bit periods. The first phase lag monitor 46 monitors the first phase lag.

In FIG. 14, the device cimprises a second phase lag monitor 76 responsive to the second preselected write and read pulse sequences 42.6 and 45.6 for monitoring the second phase lag. Each time the second phase lag decreases below the predetermined threshold, the second phase lag monitor 76 produces a second stuff demand pulse. An OR gate 77 supplies the first and the second stuff demand pulses to the stuff control circuit 47.

Turning back to FIG. 4, pulses of the second preselected write and read pulse sequences are exemplified at 42.6 and 45.6. The second phase lag varies as indicated at $\phi_4'$ and $\phi_{12}'$. The phase lag of the read pulse phases relative to the write pulse phases are sampled at a sampling interval of four input bit periods as sampled phase lags, such as $\phi_4$, $\phi_4'$, $\phi_{12}$, and $\phi_{12}'$.

Figure 15:
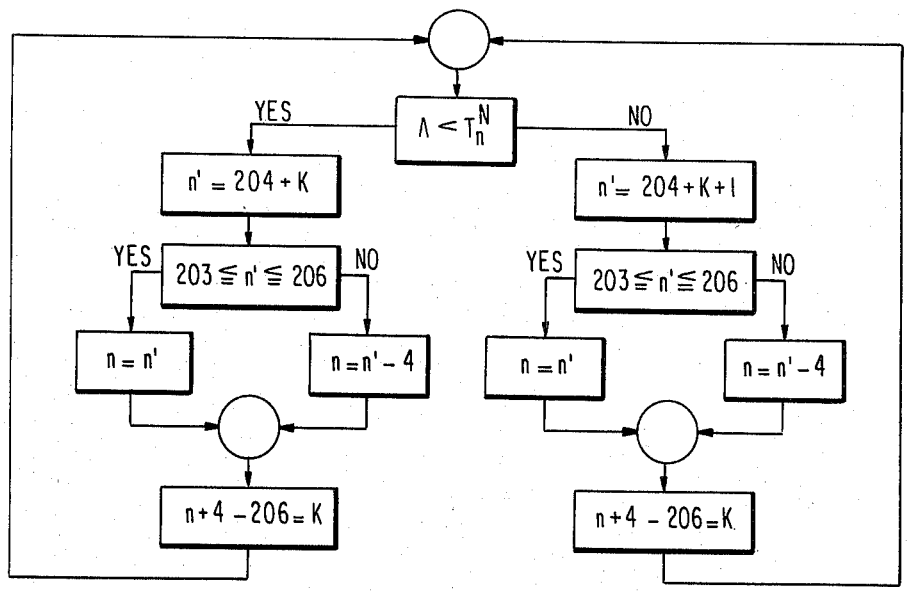
FIG. 15 shows a flow chart for use in calculating the serial number n when the varying phase lag is sampled in the device illustrated in FIG. 14 at a sampling interval equal to eight input bit periods.

Turning to FIG. 15, the renumbered serial number will again be used. The serial number n first described in conjunction with FIG. 8 will now be used to represent the greatest serial number for the monitor slots at which one and the other of the first and the second phase lags are monitored. The modified serial number n now falls between the No. 203 and No. 206 pulse slots, both inclusive. A flow chart herein depicted corresponds to that illustrated in FIG. 9 and is for use in calculating the modified serial number n.

The nominal value 14/33 of the stuff ratio will again be referred to. The stuff period is thirty-three frame periods long as before. It is convenient to understand that the modified serial number n increases two pulse slots and one more pulse slot from frame to frame when the next preceding frame has no stuff pulse and the stuff pulse, respectively. The merely summed up increase of the modified serial number n during the stuff period, is given by $2 \times 33 + 14 = 80$, which is an integral multiple of four, representative of the sampling interval in terms of the gapped pulse slot. The sampling interval therefore becomes synchronized with the stuff period. A fluctuation in the stuff period gives rise to a long-wavelength standing wave. The very low frequency jitter component, however, has a frequency only one-fourth as low as the known frequency of the waiting time jitter component rather than one-eighth as low, despite the memory capacity is eight bits. The peak to peak amplitude is only four times as wide as that of the waiting time jitter component rather than eight times as wide.

Referring to FIGS. 16 A and B, the normalized phase lag averaged over this stuff period, namely, $$\left( \sum_{N=0}^{32} T_1^N \right) / 33,$$

is calculated for the respective stuff period by the use of the flow charts illustrated in FIGS. 8 and 15 and depicted for two cases that are described in connection with FIGS. 10 A and B. In both cases, the frequency of the very low frequency jitter component is 8.159 Hz and the peak to peak amplitude, 0.118 input bit period.

Referring back to FIG. 14, it is possible to select second through up to i-th preselected write pulse sequences in addition to the "first" preselected write pulse sequence when the memory capacity is i bits. Besides the "first" preselected read pulse sequence, second through up to i-th preselected read pulse sequences should be selected in one-to-one correspondence to the second through up to i-th preselected write pulse sequences. First through up to i-th phase lag monitors, such as 46 and 76, are used in monitoring first through up to i-th phase lags of first through up to i-th preselected read pulse phases relative to first through up to i-th preselected write pulse phases. First through up to i-th stuff demand pulses are supplied to the stuff control circuit 47 through an OR gate, similar to the OR gate 77, escept for the number of inputs.

When the first through the i-th preselected write and read pulse sequences are used, the phase lag of the read pulse sequences 45.1 through 45.i relative to the write pulse sequences 42.1 through 42.i is sampled at a sampling interval of one input bit period. The long-wavelength stanting wave disappears with only the standing wave of the relatively short wavelength left. In other words, the sampling jitter component is theoretically completely suppressed.

Figure 17:
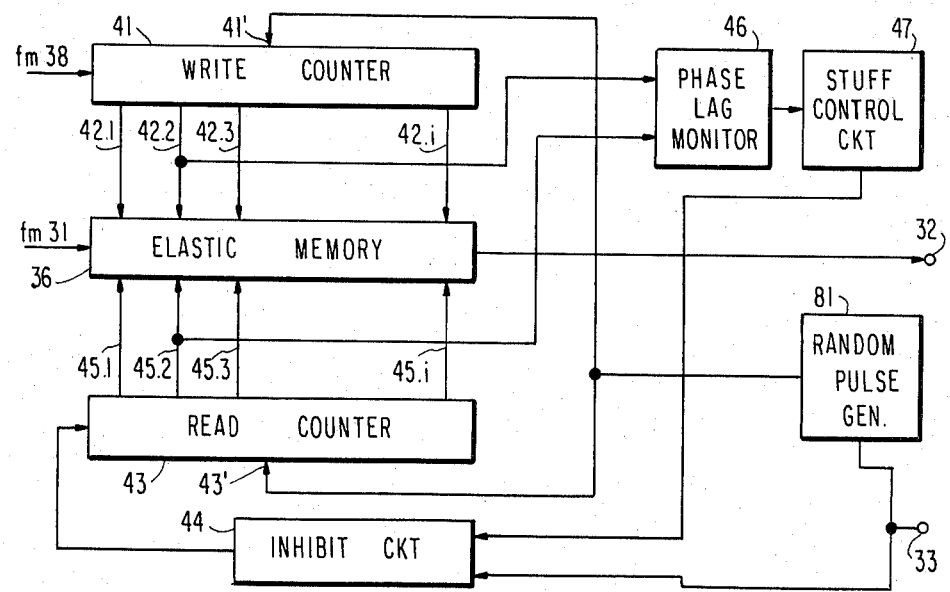
FIG. 17 is a block diagram of a part of a pulse stuff synchronization device according to a third embodiment of this invention.

Referring now to FIG. 17, a pulse stuff synchronization device according to a third embodiment of this invention comprises similar parts designated again by like reference numerals as in FIG. 3. A predetermined natural number i of bits of the memory capacity may not necessarily be prime. The write and the read counters 41 and 43 are provided with reset terminals 41' and 43'. Responsive to the reference clock pulse sequence, a random pulse generator 81, known in the data processing art, produces a sequence of random pulses having a pulse interval variable at random between i output bit periods and (i−k) output bit periods, both inclusive, where k represents a preselected natural number less than the predetermined natural number. The preselected natural number may be near i/2. The random pulses are supplied to the reset terminals 41' and 43'. Responsive to each random pulse, the write and the read counters 41 and 43 are substantially concurrently reset to produce the selected write and read pulse sequences, such as 42.2 and 45.2.

It is readily possible to make the write counter 41 produce, before the concurrent reset by a random pulse supplied thereto, the write pulse sequence or sequences, equal in number to the output bit period or periods of the pulse interval next preceding the supplied random pulse, the next previously produced write pulse sequence exclusive. For example, the write counter 41 is made to twice repeatedly produce the selected write pulse sequence when the pulse interval in question is i output bit periods long. The read counter 43 produces, before the concurrent reset, the read pulse sequences, equal in number to the write pulse sequences produced in the meantime. Only the selected write and read pulse sequences are supplied to the phase lag monitor 46, which endlessly repeatedly monitors the phase lag of the read pulse phase had by the selected read pulse sequence relative to the write pulse phase of the selected write pulse sequence.

When the pulse interval is represented by (i−j) in terms of the output bit period, where j represents an integer between zero and the preselected natural number k, both inclusive, let the integer j be variable at random among all successive integers between zero and the preselected natural number. The pulse interval is thereby varied among a plurality of values, (k+1) in number. By way of example, the pulse interval is varied at random among seven values when the predetermined and the preselected natural numbers i and k are thirteen and six. The sampling interval is equally probably distributed between (i−k) and i output bit periods. This insures that the sampling interval is kept out of synchronism with the stuff periods for all integer ratios listed in the Table.

The pulse interval may be varied in a different range, such as between (i+1) and (i−k+1) output bit periods, in order to make the resettable counters 41 and 43 produce the write and the read pulse sequences as described. Aslo, the pulse interval may be varied with the integer j varied at random among the successive integers with one or more thereof omitted, so that the pulse interval may be varied among a plurality of values, not greater in number than the preselected natural number k. The random pulse generator 81 is preferably reset at one-frame-period interval as, for example, at the leading edge of each frame so as to produce two successive random pulses at a pulse interval having a predetermined one of the $(k+1)$ or less values at the beginning of each frame. Devices modified in these manners are equivalent to the device described above.

Referring to FIG. 8, a pulse stuff synchronization device according to a modification of the device illustrated with reference to FIG. 17 comprises write and read pulse sequence selections 86 and 88 supplied with the random pulse sequence. Let the pulse interval be again variable at random among the $(k+1)$ values. The write pulse sequence selector 86 comprises first through $(k+1)$-th normally open contacts (not shown) closed only by the random pulses having next preceding pulse intervals of i through $(i-k)$ output bit periods, respectively. The "selected" write pulse sequence, such as 42.2, and the cyclically successively preceding write pulse sequences are supplied to the first through the $(k+1)$-th contacts, respectvely. When closed, each contact delivers the supplied write pulse sequence to the phase lag monitor 46. The read pulse sequence selector 88 is similar in structure and operation.

It is possible to make the write pulse sequence selector 86 select, in response to a random pulse supplied to a certain contact, a write pulse sequence having a random write pulse phase lagging behind the first write pulse phase in the cyclic order of the write pulse sequences 42.1 through 42.i by at least one input bit period, equal in number to the output bit period or periods of the pulse interval next preceding the supplied random pulse. The write pulse sequence selector 86 is made to twice repeatedly select the "selected" write pulse sequence when the pulse interval under considerations is i output bit periods long. The read pulse sequence selector 88 concurrently selects the read pulse sequence having a random read pulse phase stationarily lagging behind the first read pulse phase in the cyclic order of the read pulse sequences 45.1 through 45.i by the output bit periods of the pulse interval next previous to the supplied random pulse. The selectors 86 and 88 thus concurrently select the write and the read pulse sequences in one-to-one correspondence. If the first write and read pulse phases are had by the write and the read pulse sequences having a common serial number, equally serially numbered write and read pulse sequences are in one-to-one correspondence.

Let the "selected" write and read pulse sequences now temporarily be the second write pulse sequence 42.2 and the first read pulse sequence 45.1. These pulse sequences 42.2 and 45.1 are in one-to-one correspondence. When the pulse interval is i output bit periods long, the "selected" write and read pulse sequences 42.2 and 45.1 are twice repeatedly selected by the selectors 86 and 88 and delivered to the phase lag monitor 46. When the pulse interval is equal to $(i-1)$ output bit periods, the first write pulse sequence 42.1 and the i-th read pulse sequence 45.i next preceding the "selected" write and read pulse sequences in the cyclic order, are concurrently delivered to the phase lag monitor 46. When the pulse interval is $(i-k)$ output bit period or periods long, the $(i-k+2)$-th write pulse sequence 42.$(i-k+2)$ and the $(i-k+1)$-th read pulse sequence 45.$(i-k+1)$ are concurrently supplied to the phase lag monitor 46. In this manner, the sampling interval is equally probably distributed among $(i-k)$ through i output bit periods.

Inasmuch as the write pulse sequences 42.1 through 42.i are cyclically ordered, a write pulse phase preceding a "selected" write pulse phase by k input bit periods lags behind the "selected" write pulse phase by $(i-k)$ input bit period or periods. Likewise, a read pulse phase leading a "selected" read pulse phase stationarily by k output bit periods has a stationary phase retardation of $(i-k)$ output bit period or periods relative to the "selected" read pulse phase. The figure is drawn, assuming that the selected write and read pulse sequences are the second write and read pulse sequences 42.2 and 45.2 merely for simplicity of illustration.

Figure 19:
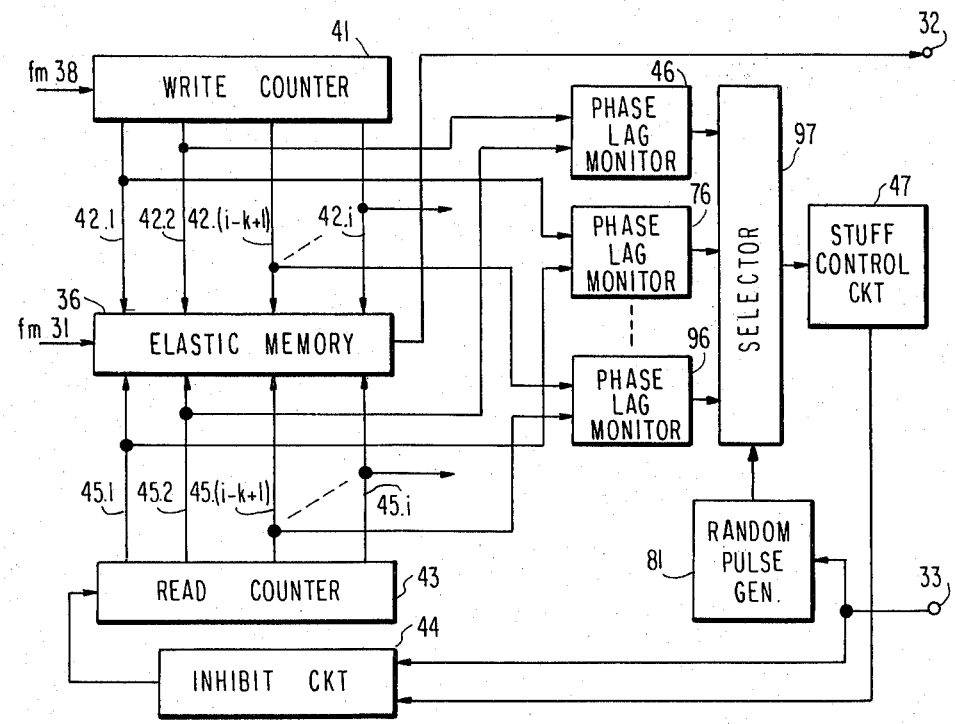
FIG. 19 is a partial block diagram of a pulse stuff synchronization device according to another modification of the device shown in FIG. 17.

Referring to FIG. 19, a pulse stuff synchronization device according to another modification of the device illustrated with reference to FIG. 17 comprises first through $(k+1)$-th phase lag monitors 46, 76, ..., and 96 when the pulse interval is again variable at random among $(k+1)$ values. Let the "selected" write and read pulse sequences be the second write and read pulse sequences 42.2 and 45.2. The first phase lag monitor 46 is for monitoring a first phase lag of the read pulse phase had by the second read pulse sequence 42.2 relative to the write pulse phase of the second write pulse sequence 45.2. The second through the $(k+1)$-th phase lag monitors 76, ..., and 96 are for phase lags had by the read pulse phases of the first read pulse sequence and the cyclically successively preceding read pulse sequences 45.1, 45.i, ..., and 45.$(i-k+1)$ relative to the write pulse phases of the first write pulse sequence and the cyclically successively preceding write pulse sequence 42.1, 42.i, ..., and 42.$(i-k+1)$, respectively. The first through the $(k+1)$-th phase lag monitors 46, 76, ..., and 96 produce first through $(k+1)$ stuff demand pulses, respectively, every time the thereby monitored phase lags decrease below the predetermined threshold. The device being illustrated is similar in these respects to that described with reference to FIG. 14 but is different therefrom in that the number of phase lag monitors 46, 76, ..., and 96 and the preselected natural number k for the random pulse sequence should be decided relative to each other.

In FIG. 19, the device further comprises a stuff demand pulse selector 97 responsive to the random pulse sequence for selecting the first through the $(k+1)$-th stuff demand pulses when each random pulse supplied thereto next precedes a pulse interval that is i through $(i-k)$ output bit periods long, respectively. Although differently named, the stuff pulse selector 97 is similar in structure to each pulse sequence selector 86 or 88. The sampling interval is again equally probably distributed among $(i-k)$ through i output bit periods.

Figure 20:
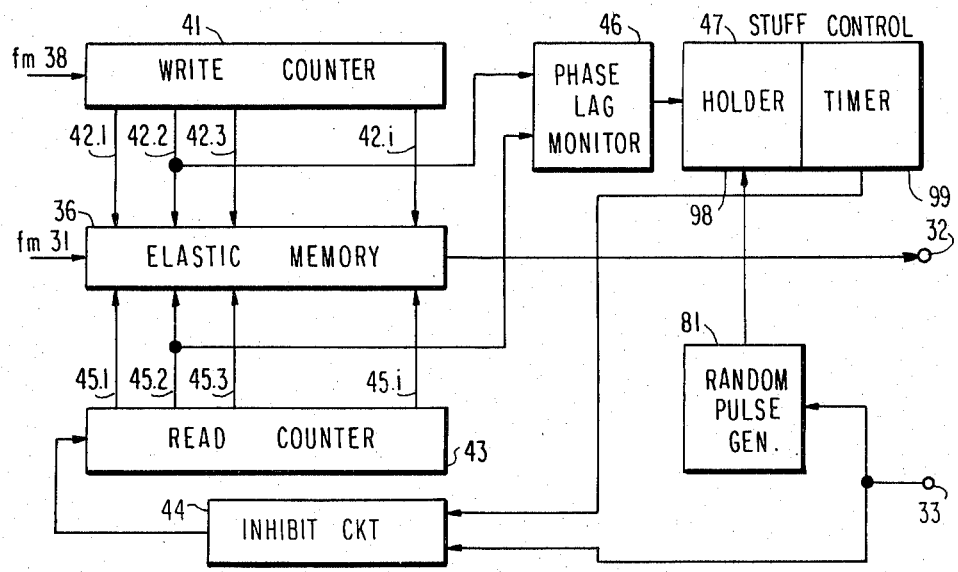
FIG. 20 is a partial block diagram of a pulse stuff synchronization device according to still another modification of the device depicted in FIG. 17.

Finally referring to FIG. 20, a pulse stuff synchronization device according to still another modification of the device illustrated with reference to FIG. 17 is for equivalently randomizing the sampling intervals. In other words, the sampling interval is equivalently equally probably distributed among $(i-k)$ through i output bit periods in response to the random pulse sequence. The known stuff control circuit 47 comprises a holding section 98 for holding each stuff demand pulse during a holding interval between the monitor slot in a certain frame at which that stuff demand pulse is produced and a pulse slot predetermined relative to the next subsequent frame, such as the leading end pulse slot (the No. 1 ungapped or gapped pulse slot) of the next following frame, and a timer section 99 for producing the held stuff demand pulse at the variable slot in the latter frame as the inhibit pulse. The stuff control circuit 47 may therefore be supplied with the reference clock pulse sequence. Each random pulse controls the holding section 98 so as to lengthen the holding interval in relation to the pulse interval next preceding the supplied random pulse. By way of example, the holding interval is lengthened by the output bit period or periods of the pulse interval less (i−k).

Figure 18:
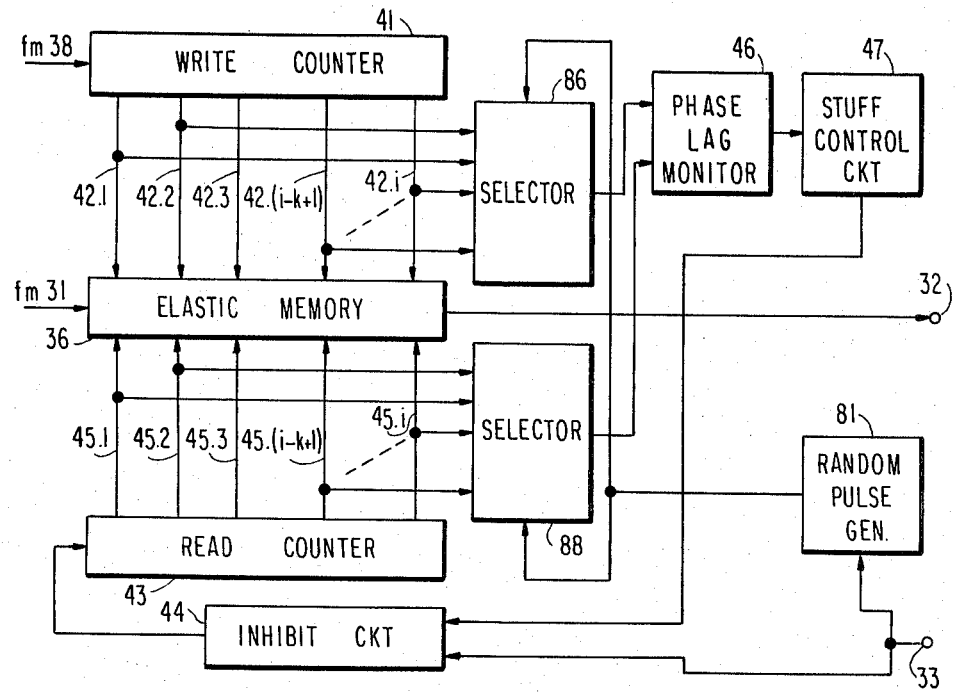
FIG. 18 is a partial block diagram of a pulse stuff synchronization device according to a modification of the device illustrated in FIG. 17.

While a few preferred embodiments of this invention and various modifications thereof have thus far been described, it willl now be readily possible for those skilled in the art to carry this invention into effect in a number of other ways. For example, the invention is equally well applicable to a pulse stuff synchronization device for other set of input and output bit rates in any order of multiplication. The frame structure may therefore be varied accordingly. A frame including a monitor slot and later at least one variable slot is equivalent to the frame of the format described heretofore. The modifications described in conjunction with FIG. 17 are applicable to the modifications illustrated with reference to FIGS. 18 through 20. The contacts of the pulse sequence selector 86 or 88 may be supplied with the preselected write or read pulse sequences, equal in number at most to (k+1), in a way different from that described in connection with FIG. 18 because the pulse interval is variable at random. This applies to the contacts of the stuff demand pulse selector 97. The number of such contacts in each selector may either be equal to the number of values among which the pulse interval is variable at random or less.

Inasmuch as the write and the read pulse sequences are cyclically serial, it is possible to renumber the "selected" write and read pulse sequences as the first write and read pulse sequences. The cyclically successively following write and read pulse sequences are renumbered as the second through the i-th write and read pulse sequences, where i represents the natural number predetermined for the number of memory cells 37.1 through 37.i, namely, the memory capacity of the elastic memory 36. In this event, the write and the read pulse phases should accordingly be renumbered. The phase lags may be serially numbered depending on the circumstances.

What is claimed is:

1. A pulse stuff synchronization device responsive to an input pulse sequence comprising input information pulses at an input bit rate for producing an output pulse sequence comprising output information pulses and stuff pulses in selected ones of consecutive pulse slots defined by a reference clock pulse sequence of an output bit rate higher than said input bit rate, said consecutive pulse slots being divisible into a succession of frames and including that at least one predetermined pulse slot in each frame in which said output pulse sequence includes a selected one of said output information pulses and said stuff pulses to arrange said input information pulses in said output pulse sequence as the respective output information pulses in synchronism with said reference clock pulse sequence, said device comprising (a) i one-bit memory cells, where i represents a predetermined natural number equal at least to two, (b) means for producing first through i-th write pulse sequences having first through i-th cyclically retarding write pulse phases, respectively, for use in storing said input information pulses cyclically in said memory cells, (c) gapping means responsive to said reference clock pulse sequence and a control pulse produced in one frame for providing a gap between the reference clock pulses at the predetermined pulse slot in a frame next succeeding said one frame to produce a gapped clock pulse sequence in response to successive control pulses, (d) means responsive to said gapped clock pulse sequence for distributing the gapped clock pulses into first through i-th read pulse sequences having first through i-th cyclically retarding read pulse phases, respectively, to produce said first through said i-th read pulse sequences, said first read pulse phase having a phase lag relative to said first write pulse phase, (e) means responsive to said first through said i-th read pulse sequences for cyclically reading as said output information pulses the input information pulses stored in said memory cells, (f) means for sampling phase lags of said first through said i-th read pulse phases relative to said first through said i-th write pulse phases, respectively, to provide sampled phase lags from time to time, (g) phase lag monitoring means coupled to said sampling means for monitoring said sampled phase lags to successively produce stuff demand pulses every time said sampled phase lags decrease below a predetermined threshold and (h) supplying means for supplying said stuff demand pulses as said successive control pulses to said gapping means, said output pulse sequence being subject to a jitter component when said sampled phase lags are sampled at a sampling interval substantially equal to i input bit periods, wherein the improvement comprises jitter reducing means for reducing said jitter component, said jitter reducing means comprising:

a random pulse generator responsive to said reference clock pulse sequence for producing a sequence of random pulses having a pulse interval variable at random between i and (i−k) output bit periods, both inclusive, where k represents an integer preselected from natural numbers less than said predetermined natural number; and means coupled to a selected one of said sampling means and said phase lag monitoring means and responsive to said random pulse sequence for randomizing time intervals between said sampled phase lags.

2. A pulse stuff synchronization device as claimed in claim 1, wherein:

said write pulse sequence producing means is resettable and produces said first write pulse sequence when reset;

said gapped clock pulse distributing means being resettable and producing said first read pulse sequence when reset;

said randomizing means comprising:

means coupled to said resettable write pulse sequence producing means and said resettable gapped clock pulse distributing means and responsive to each of said random pulses for concurrently resetting said resettable write pulse sequence producing means and said resettable gapped clock pulse distributing means to make said resettable write pulse sequence producing means produce, before the concurrent reset, the write pulse sequences, equal in number to the at least one input bit period of the pulse interval next preceding said each random pulse except for the next previously produced first write pulse sequence, and to make said resettable gapped clock pulse distributing means produce, before the concurrent reset, the read pulse sequence, equal in number to the at least one output bit period of the pulse interval next preceding said each random pulse except for the next previously produced first read pulse sequence; and means for supplying said first write and read pulse sequences to said sampling means;

said sampling means repeatedly using as said sampled phase lags the phase lag of said first read pulse phase relative to said first write pulse phase.

3. A pulse stuff synchronization device as claimed in claim 1, wherein:

said randomizing means comprises:

means coupled to said write pulse sequence producing means and said gapped clock pulse distributing means and responsive to each of said random pulses for concurrently selecting one of said write pulse sequences and one of said read pulse sequences, said selected write pulse sequence having a random write pulse phase lagging in the cyclic order of said first through said i-th write pulse sequences behind said first write pulse phase by at least one input bit period corresponding to the at least one output bit period of the pulse interval next preceding said each random pulse, said selected read pulse sequence having a random read pulse phase lagging in the cyclic order of said first through said i-th read pulse sequences behind said first read pulse phase by the at least one output bit period of the pulse interval next preceding said each random pulse; and means for supplying said sampling means with the selected write and read pulse sequences successively selected in response to the respective random pulses;

said sampling means using, as said sampled phase lags, phase lags each of which is had by the random read pulse phase of one of said selected read pulse sequences relative to the random write pulse phase of the concurrently selected write pulse sequence.

4. A pulse stuff synchronization device as claimed in claim 1, wherein:

said randomizing means comprises:

means responsive to said write pulse sequences for producing first through (k+1)-th preselected ones of said write pulse sequences having first through (k+1)-th preselected write pulse phases, respectively, said first through said (k+1)-th preselected write pulse phases lagging in the cyclic order or said first through said i-th write pulse sequences behind said first write pulse phase by first through (k+1)-th input bit periods, respectively;

means responsive to said read pulse sequences for producing first through (k+1)-th preselected ones of said read pulse sequences having first through (k+1)-th preselected read pulse phases, respectively, said first through said (k+1)-th preselected read pulse phases lagging in the cyclic order of said first through said i-th read pulse sequences behind said first read pulse phase by first through (k+1)-th output bit periods, respectively, said first through said (k+1)-th output bit periods corresponding to said first through said (k+1)-th input bit periods, respectively, said first through said (k+1)-th preselected read pulse sequences thereby being in one-to-one correspondence to said first through said (k+1)-th preselected write pulse sequences, said first through said (k+1)-th preselected read pulse phases having first through (k+1)-th phase lags relative to said first through said (k+1)-th preselected write pulse phases, respectively; and means for cyclically supplying said first through said (k+1)-th preselected write and read pulse sequences to said sampling means;

said sampling means cyclically using said first through said (k+1)-th phase lags as said sampled phase lags;

said phase lag monitoring means comprising first through (k+1)-th phase lag monitors for monitoring said first through said (k+1)-th phase lags, respectively, to produce first through (k+1)-th stuff demand pulses, respectively, every time the respective ones of said first through said (k+1)-th phase lags decrease below said predetermined threshold;

said randomizing means further comprising a selector responsive to each of said random pulses for selecting, as one of the stuff demand pulses recited in claim 1, one of said first through said (k+1)-th stuff demand pulses that is serially numbered by a number equal to the number of at least one output bit period of the pulse interval next preceding said each random pulse.

5. A pulse stuff synchronization device as claimed in claim 1, 2, 3, 4, wherein said pulse interval is variable at random among (k+1) values.

6. A pulse stuff synchronization device responsive to an input pulse sequence comprising input information pulses at an input bit rate for producing an output pulse sequence comprising output information pulses and stuff pulses in selected ones of consecutive pulse slots defined by a reference clock pulse sequence of an output bit rate higher than said input bit rate, said consecutive pulse slots being divisible into a succession of frames and including that at least one predetermined pulse slot in each frame in which said output pulse sequence includes a selected one of said output information pulses and said stuff pulses to arrange said input information pulses in said output pulse sequence as the respective output information pulses in synchronism with said reference clock pulse sequence, said device comprising (a) i one-bit memory cells, where i represents a predetermined natural number equal at least to two, (b) means for producing first through i-th write pulse sequences having first through i-th cyclically retarding write pulse phases, respectively, for use in storing said input information pulses cyclically in said memory cells, (c) gapping means responsive to said reference clock pulse sequence and a control pulse produced in one frame for providing a gap between the reference clock pulses at the predetermined pulse slot in a frame next succeeding said one frame to produce a gapped clock pulse sequence in response to successive control pulses, (d) means responsive to said gapped clock pulse sequence for distributing the gapped clock pulses into first through i-th read pulse sequences having first through i-th cyclically retarding read pulse phases, respectively, to produce said first through said i-th read pulse sequences, said first read pulse phase having a phase lag relative to said first write pulse phase, (e) means responsive to said first through i-th read pulse sequences for cyclically reading as said output information pulses the input information pulses stored in said memory cells, (f) means for sampling phase lags of said first through said i-th read pulse phases relative to said first through said i-th write pulse phases, respectively, to provide sampled phase lags from time to time, (g) phase lag monitoring means coupled to means for monitoring said sampled phase lags to successively produce stuff demand pulses every time said sampled phase lags decrease below a predetermined threshold, said output pulse sequence being subject to a jitter component when said sampled phase lags are sampled at a sampling interval substantially equal to i input bit periods, (h) supplying means for supplying said stuff demand pulses as said successive control pulses to said gapping means, said supplying means comprising:

holding means for holding each of said stuff demand pulses during an interval of time between a pulse slot in said one frame at which said each stuff demand pulse is produced and a pulse slot predetermined relative to said next succeeding frame and means for producing said held stuff demand pulse as said control pulse in the predetermined pulse slot in said next succeeding frame; and (i) jitter reducing means comprising:

a random pulse generator responsive to said reference clock pulse sequence for producing a sequence of random pulses having a pulse interval variable at random between i and (i−k) output bit periods, both inclusive, where k represents an integer preselected from natural numbers less than said predetermined natural number and means coupled to said holding means and responsive to each of said random pulses for lengthening said interval of time in relation to the pulse interval next preceding said each random pulse.

7. A pulse stuff synchronization device as claimed in claim 6, wherein said pulse interval is variable at random among (k+1) values.

8. A pulse stuff synchronization device responsive to an input pulse sequence comprising input information pulses at an input bit rate for producing an output pulse sequence comprising output information pulses and stuff pulses in selected ones of consecutive pulse slots defined by a reference clock pulse sequence of an output bit rate higher than said input bit rate, said consecutive pulse slots being divisible into a succession of frames and including that at least one predetermined pulse slot in each frame in which said output pulse sequence includes a selected one of said output information pulses and said stuff pulses to arrange said input information pulses in said output pulse sequence as the respective output information pulses in synchronism with said reference clock pulse sequence, said device comprising (a) i one-bit memory cells, where i represents a predetermined natural number equal at least to two, (b) means for producing first through i-th write pulse sequences having first through i-th cyclically retarding write pulse phases, respectively, for use in storing said input information pulses cyclically in said memory cells, (c) gapping means responsive to said reference clock pulse sequence and a control pulse produced in one frame for providing a gap between the reference clock pulses at the predetermined pulse slot in a frame next succeeding said one frame to produce a gapped clock pulse sequence in response to successive control pulses, (d) means responsive to said gapped clock pulse sequence for distributing the gapped clock pulses into first through i-th read pulse sequences having first through i-th cyclically retarding read pulse phases, respectively, to produce said first through said i-th read pulse sequences, said first read pulse phase having a phase lag relative to said first write pulse phase, (e) means responsive to said first through said i-th read pulse sequences for cyclically reading as said output information pulses the input information pulses stored in said memory cells, (f) means for sampling phase lags of said first through said i-th read pulse phases relative to said first through said i-th write pulse phases, respectively, to provide sampled phase lags from time to time, (g) phase lag monitoring means coupled to said sampling means for monitoring said sampled phase lags to successively produce stuff demand pulses every time said sampled phase lags decrease below a predetermined threshold, and (h) supplying means for supplying said stuff demand pulses as said successive control pulses to said gapping means, said output pulse sequence being subject to a jitter component when said sampled phase lags are sampled at a sampling interval substantially equal to i input bit periods, wherein the improvement is characterized in that said predetermined natural number is a selected prime number having a value greater than or equal to three, thereby reducing said jitter component.

* * * * *

UNITED STATES PATENT AND TRADEMARK OFFICE
CERTIFICATE OF CORRECTION

PATENT NO. : 4,397,017

DATED : August 2, 1983

INVENTOR(S) : Yoshinori Rokugo

It is certified that error appears in the above-identified patent and that said Letters Patent is hereby corrected as shown below:

ON THE TITLE PAGE:

Between lines [22] and [51],
add --[30] Foreign Application Priority Data
March 10, 1980    Japan . . . . . 55-30128
March 10, 1980    Japan . . . . . 55-30129
May 27, 1980      Japan . . . . . 55-70301--.

Column 1, line 22, before "predetermined", insert --a--.

Column 2, line 29, after "each", correct the spelling of "frame";

line 37, after "stuff", change "orjustification" to --or justification--.

Column 3, line 35, after "each", correct the spelling of "frame".

Column 8, line 49, before "pulse", change "wire" to --write--.

Column 9, line 38, after "the", change "pulse" to --phase--.

UNITED STATES PATENT AND TRADEMARK OFFICE
CERTIFICATE OF CORRECTION

PATENT NO. : 4,397,017                      Page 2 of 4

DATED : August 2, 1983

INVENTOR(S) : Yoshinori Rokugo

It is certified that error appears in the above-identified patent and that said Letters Patent is hereby corrected as shown below:

```
        Column 11, line 17, before "lag", change "phae" to
--phase--;
                  line 39, after "a", change "stuf" to --stuff--;
                  line 40, after "No.", change "55" to --155--;
                  line 44, before "lag", change "phae" to
--phase--.

Column 13, line 37, after "to", insert --a--;
                  line 51, correct the spelling of
--threshold".

Column 14, line 22, before "inclusive", change "but" to
--both--.

Column 15, line 40, change "fram eis" to --frame is--;
                  line 58, change "trancing" to --tracing--;
                  line 59, change "frequence" to
--frequency--.

Column 16, line 61, change "exept" to --except--;
                  line 65, change "frequencyof" to
--frequency of--.
```

UNITED STATES PATENT AND TRADEMARK OFFICE
CERTIFICATE OF CORRECTION

PATENT NO. : 4,397,017                           Page 3 of 4
DATED      : August 2, 1983
INVENTOR(S): Yoshinori Rokugo It is certified that error appears in the above-identified patent and that said Letters Patent is hereby corrected as shown below:

Column 17, line 39, change "other wise" to --otherwise--.

Column 18, line 62, change "cimprises" to --comprises--.

Column 20, line 2, before "for", change "esept" to --except--;
line 8, before "wave", change "stanting" to --standing--.

Column 21, line 13, after "FIG", change "8" to --18--;
line 16, before "86", change "selections" to --selectors--;
line 40, after "under", change "considerations" to --consideration--.

Column 24, line 66, after "one", change "input" to --output--.

UNITED STATES PATENT AND TRADEMARK OFFICE
CERTIFICATE OF CORRECTION

PATENT NO. : 4,397,017

DATED : August 2, 1983

INVENTOR(S) : Yoshinori Rokugo

It is certified that error appears in the above-identified patent and that said Letters Patent is hereby corrected as shown below:

Column 25, line 51, after "order", change "or" to --of--.

Signed and Sealed this

Twenty-seventh Day of November 1984

[SEAL]

Attest:

GERALD J. MOSSINGHOFF

Attesting Officer

Commissioner of Patents and Trademarks